United States Patent
Choi et al.

(10) Patent No.: US 11,576,100 B2
(45) Date of Patent: Feb. 7, 2023

(54) METHOD FOR PERFORMING HANDOVER BY USING BLUETOOTH IN WIRELESS COMMUNICATION SYSTEM, AND DEVICE THEREFOR

(71) Applicant: LG ELECTRONICS INC., Seoul (KR)

(72) Inventors: Jingu Choi, Seoul (KR); Taeyoung Song, Seoul (KR); Hyeonjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 16/965,962

(22) PCT Filed: Jan. 29, 2019

(86) PCT No.: PCT/KR2019/001233
§ 371 (c)(1),
(2) Date: Jul. 29, 2020

(87) PCT Pub. No.: WO2019/147107
PCT Pub. Date: Aug. 1, 2019

(65) Prior Publication Data
US 2021/0045032 A1 Feb. 11, 2021

Related U.S. Application Data

(60) Provisional application No. 62/623,524, filed on Jan. 29, 2018.

(51) Int. Cl.
*H04W 36/30* (2009.01)
*H04W 4/80* (2018.01)

(52) U.S. Cl.
CPC ............ *H04W 36/30* (2013.01); *H04W 4/80* (2018.02)

(58) Field of Classification Search
CPC ....... H04W 36/30; H04W 4/80; H04W 36/36; H04W 12/06
See application file for complete search history.

(56) References Cited

U.S. PATENT DOCUMENTS

2014/0177615 A1* 6/2014 Kim ...................... H04W 8/005
370/338
2016/0164875 A1* 6/2016 Zhang ............... H04W 12/0431
726/4

(Continued)

FOREIGN PATENT DOCUMENTS

KR 1020060075527 7/2006
KR 1020080101424 11/2018

(Continued)

OTHER PUBLICATIONS

PCT International Application No. PCT/KR2019/001233, International Search Report dated May 21, 2019, 4 pages.

*Primary Examiner* — Charles N Appiah
*Assistant Examiner* — Frank E Donado
(74) *Attorney, Agent, or Firm* — Lee Hong Degerman Kang & Waimey

(57) ABSTRACT

Provided in the present specification is a method by which a user device performs a handover in a wireless communication system. Particularly, the method by which a user device performs a handover comprises the steps of: connecting by Bluetooth with a first target device on the basis of first authentication information; measuring a first link state between the user device and the first target device; measuring a second link state between the user device and the second target device; determining whether to perform a handover for the second target device on the basis of the first link state and the second link state; and performing a Bluetooth connection procedure with the second target device when performance of the handover for the second (Continued)

target device is determined, wherein second authentication information for the Bluetooth connection procedure with the second target device is the same as the first authentication information for the Bluetooth connection with the first target device.

14 Claims, 18 Drawing Sheets

(56) References Cited

U.S. PATENT DOCUMENTS

| | | | | |
|---|---|---|---|---|
| 2017/0019390 | A1* | 1/2017 | Gu | H04L 67/12 |
| 2018/0324548 | A1* | 11/2018 | Venkatraman | H04W 8/005 |
| 2019/0037470 | A1* | 1/2019 | Yeh | H04W 40/12 |
| 2019/0327611 | A1* | 10/2019 | Middelesch | H04W 12/0431 |

FOREIGN PATENT DOCUMENTS

| | | | |
|---|---|---|---|
| WO | 2012033340 | 3/2012 | |
| WO | WO-2014183344 A1 * | 11/2014 | H04L 63/0869 |
| WO | 2016017909 | 2/2016 | |
| WO | 2016039598 | 3/2016 | |

\* cited by examiner

【FIG. 1】
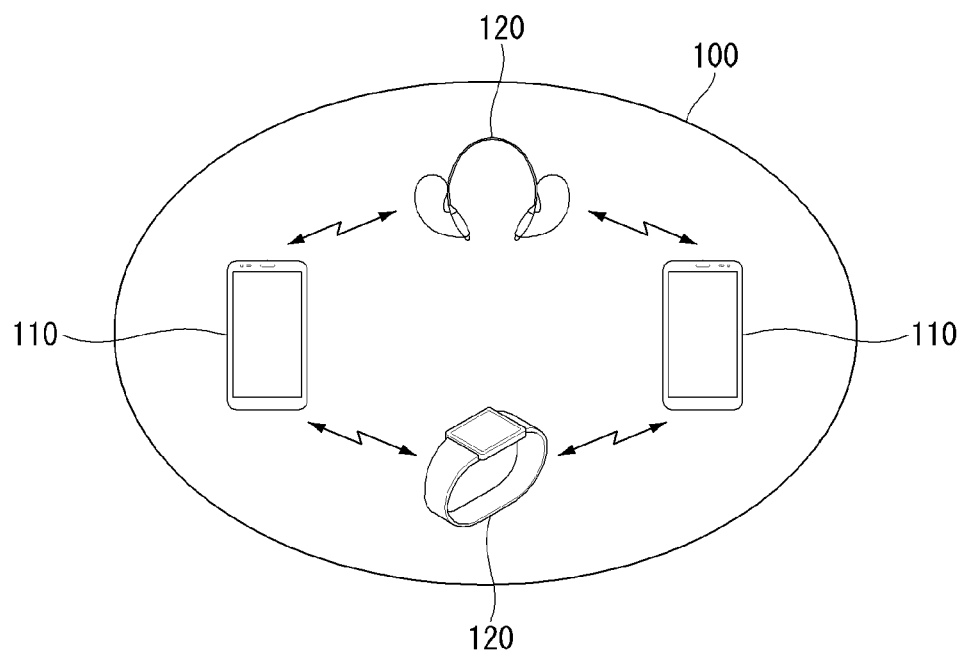

[FIG. 2]
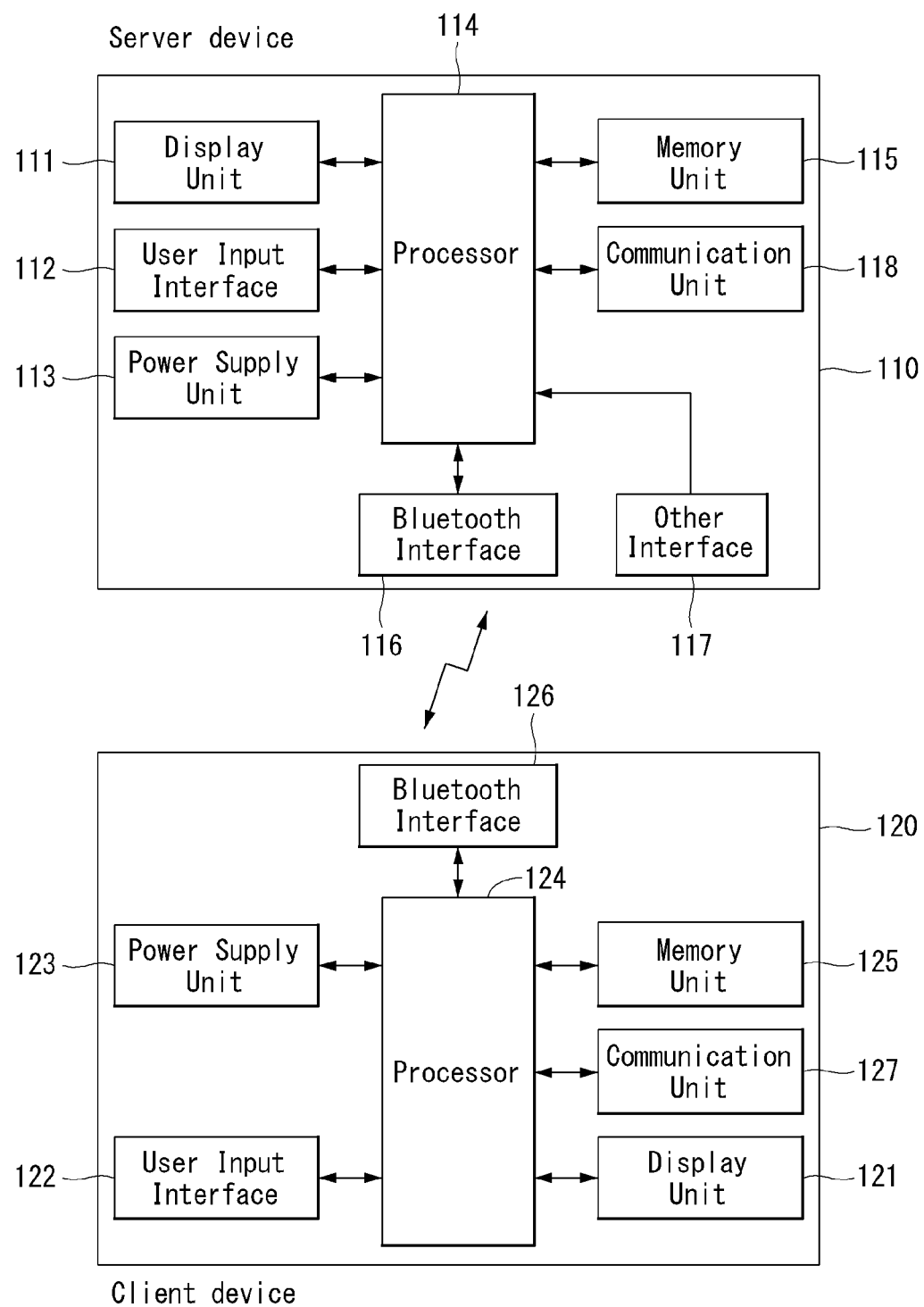

[FIG. 3]
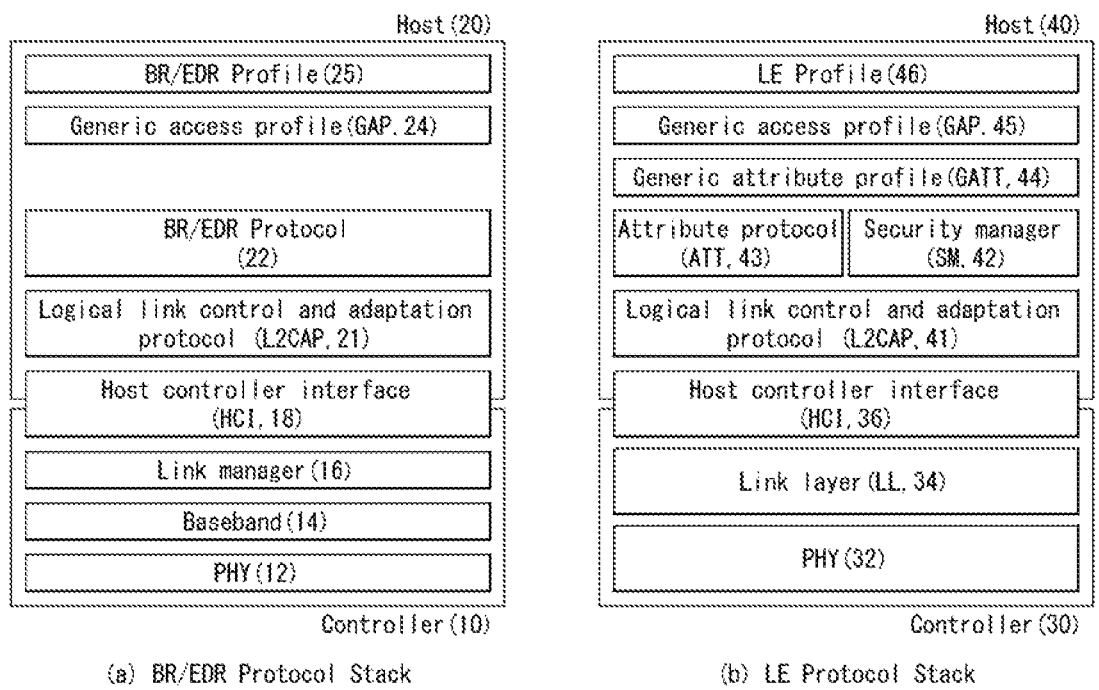
(a) BR/EDR Protocol Stack  (b) LE Protocol Stack

[FIG. 4]
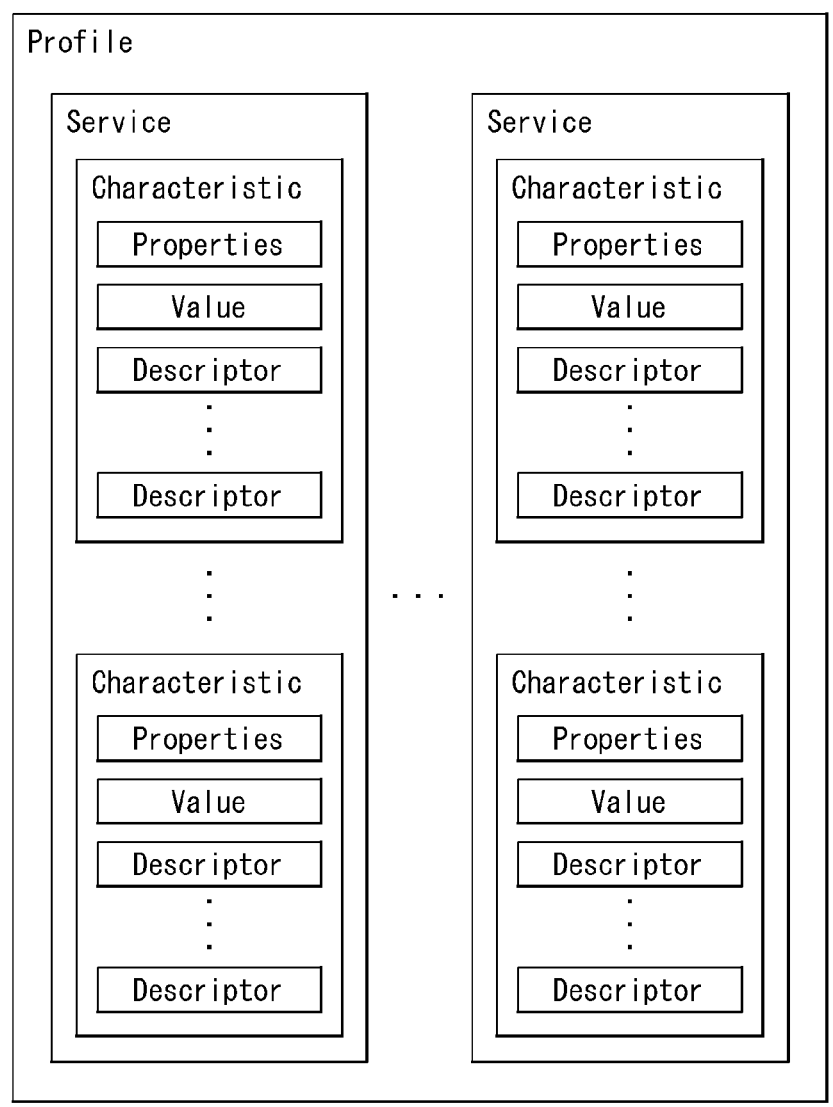

[FIG. 5]
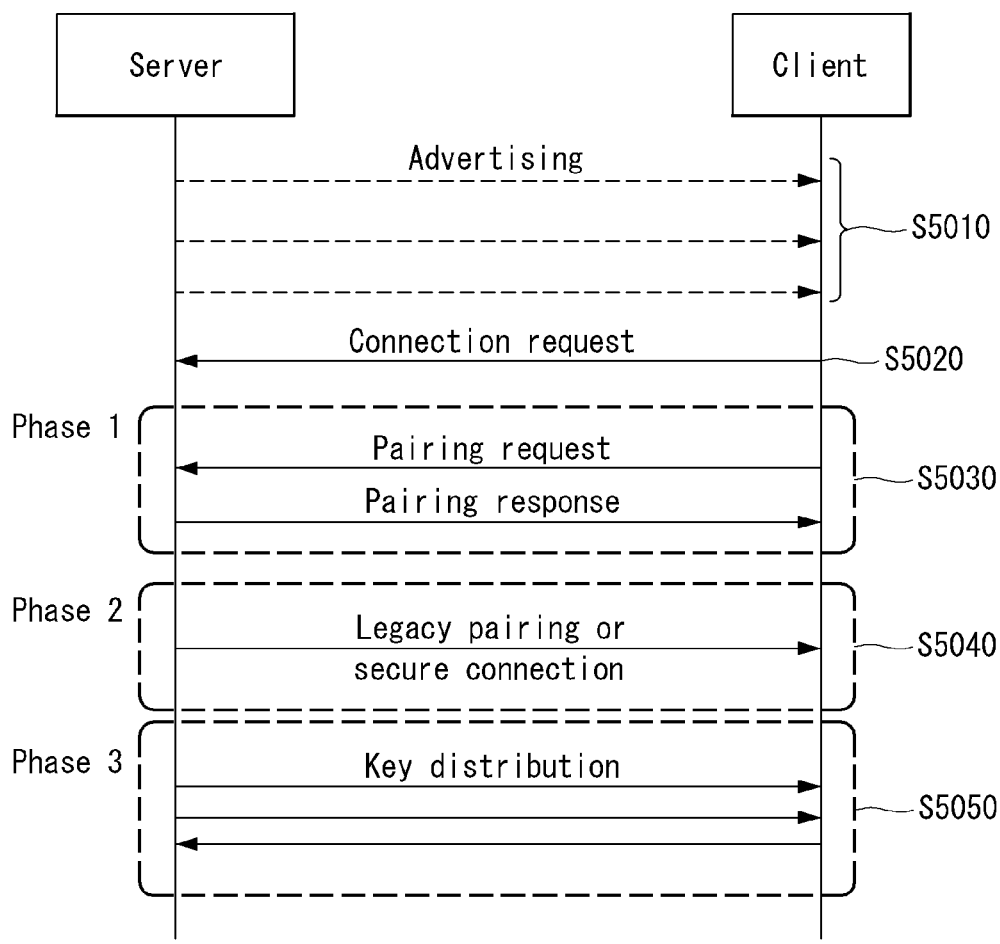

[FIG. 6]
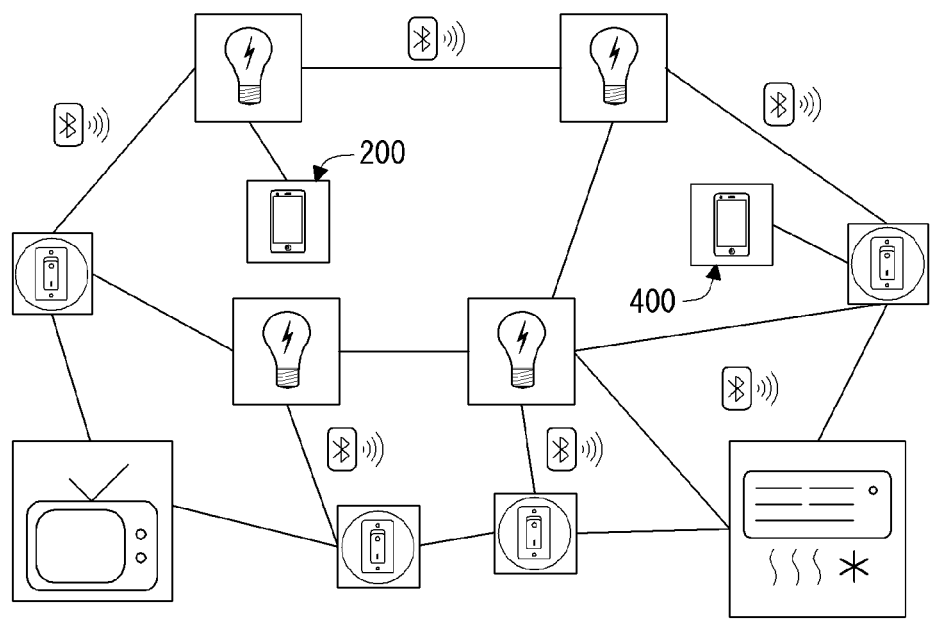

[FIG. 7]
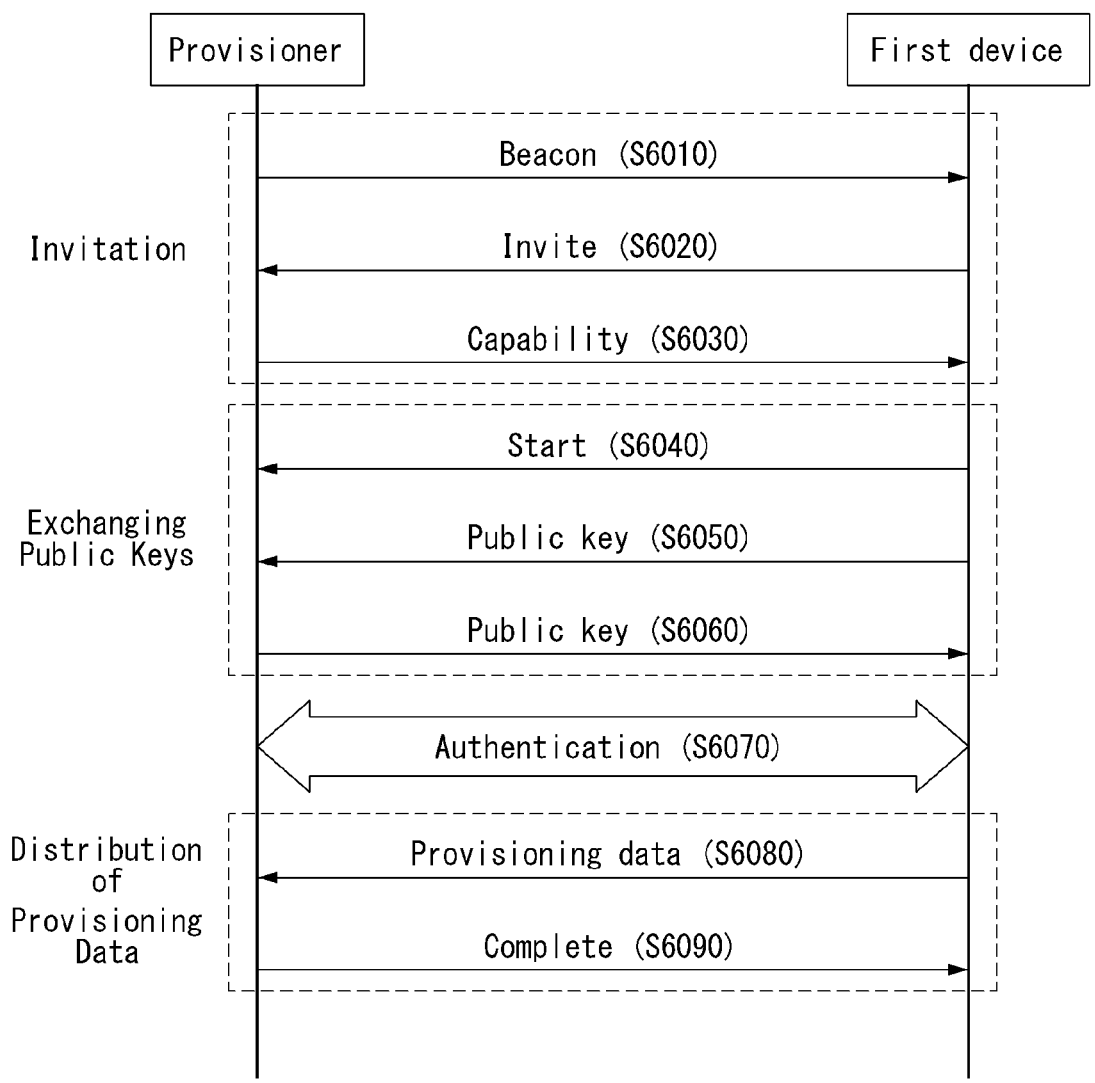

[FIG. 8]
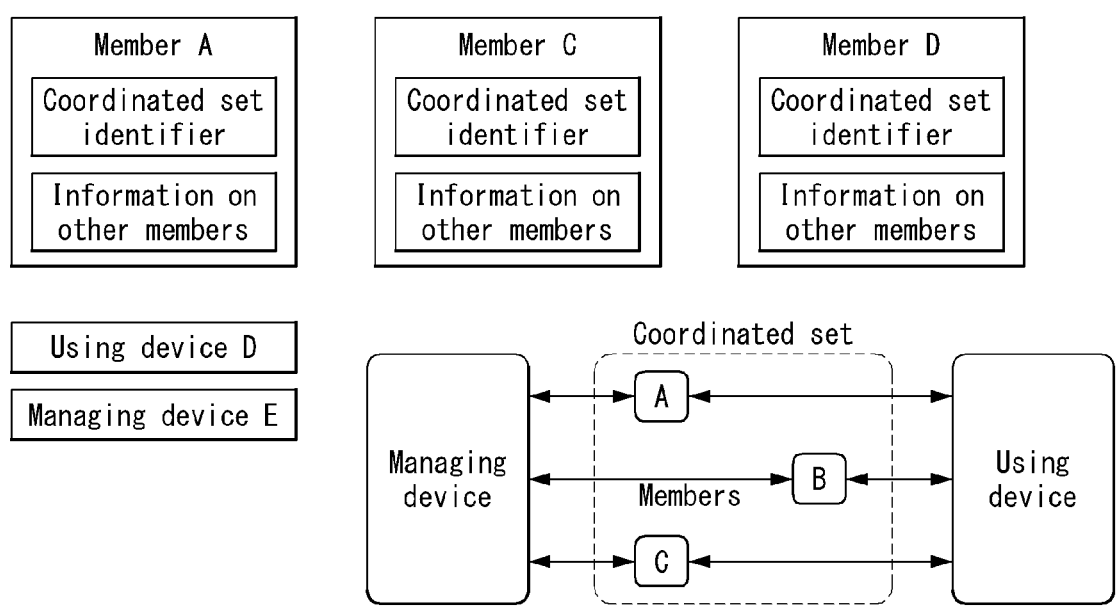

[FIG. 9]
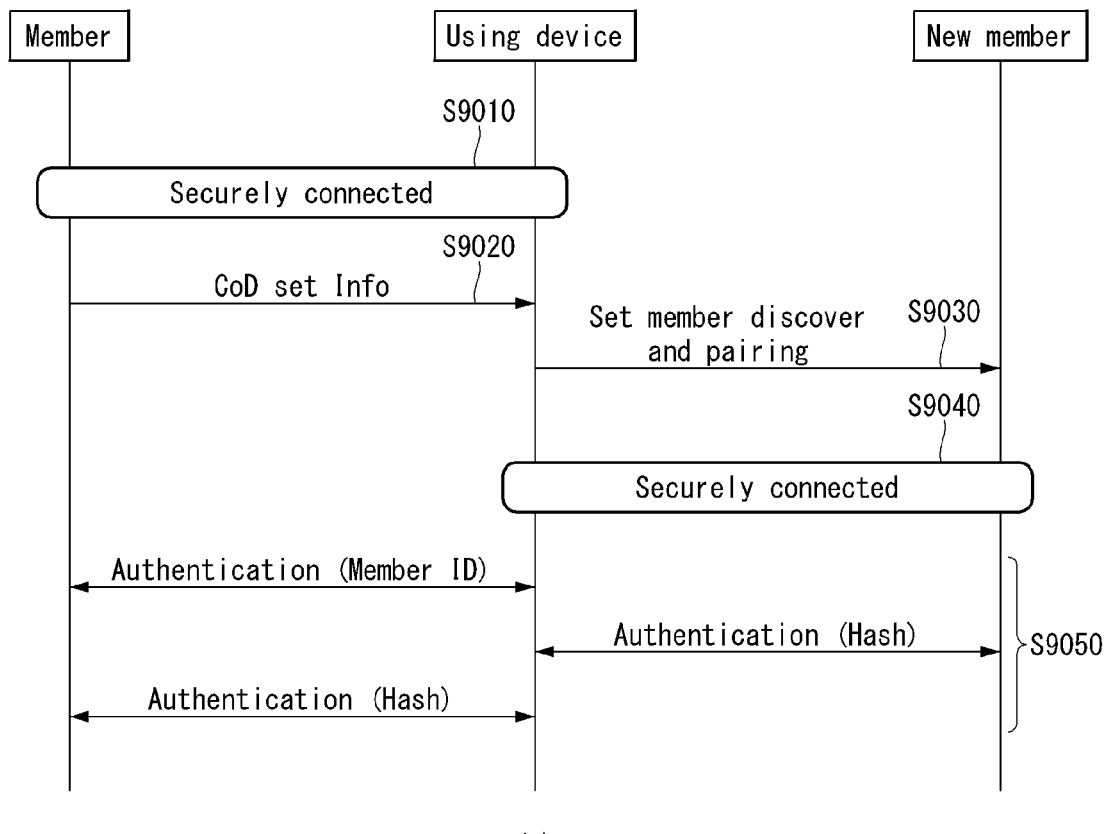
(a)
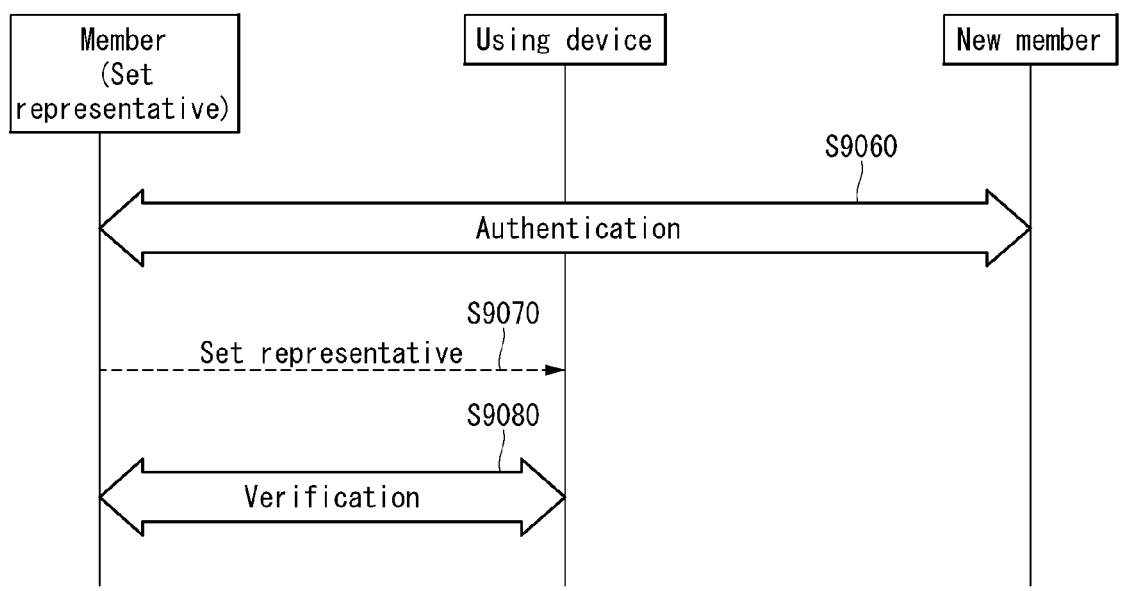
(b)

[FIG. 10]
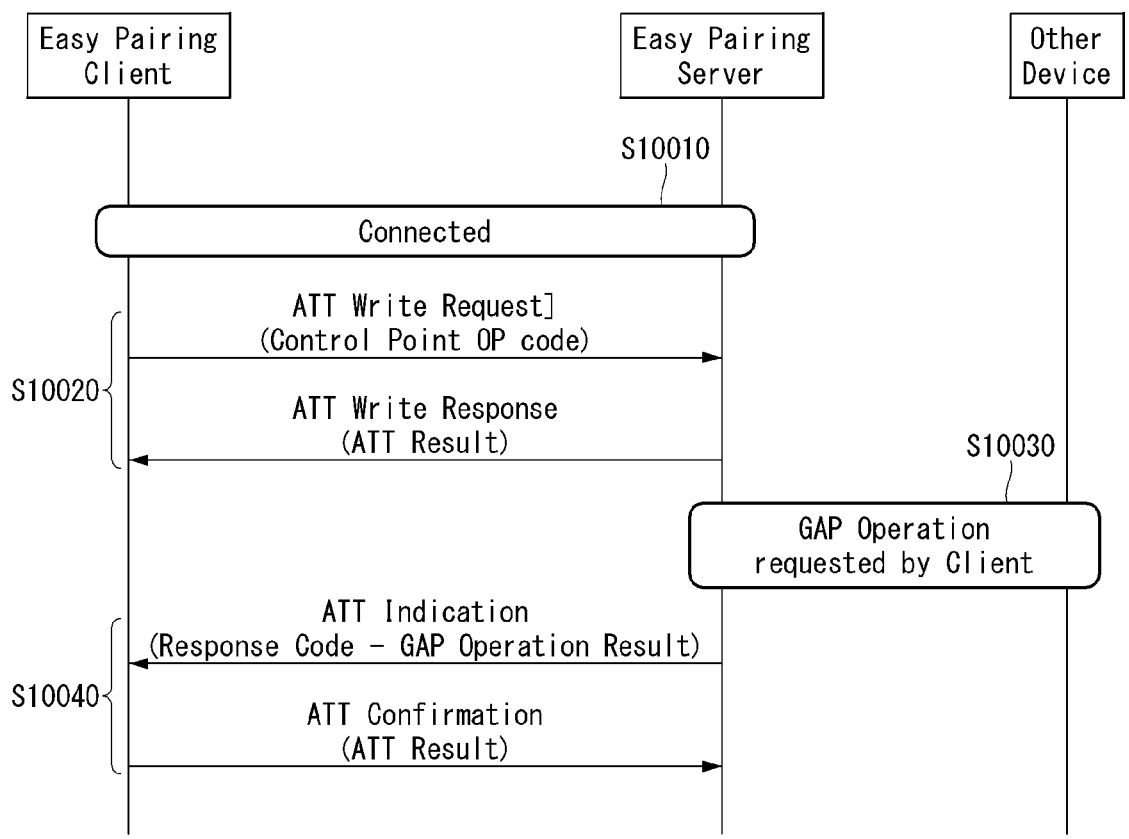

[FIG. 11]
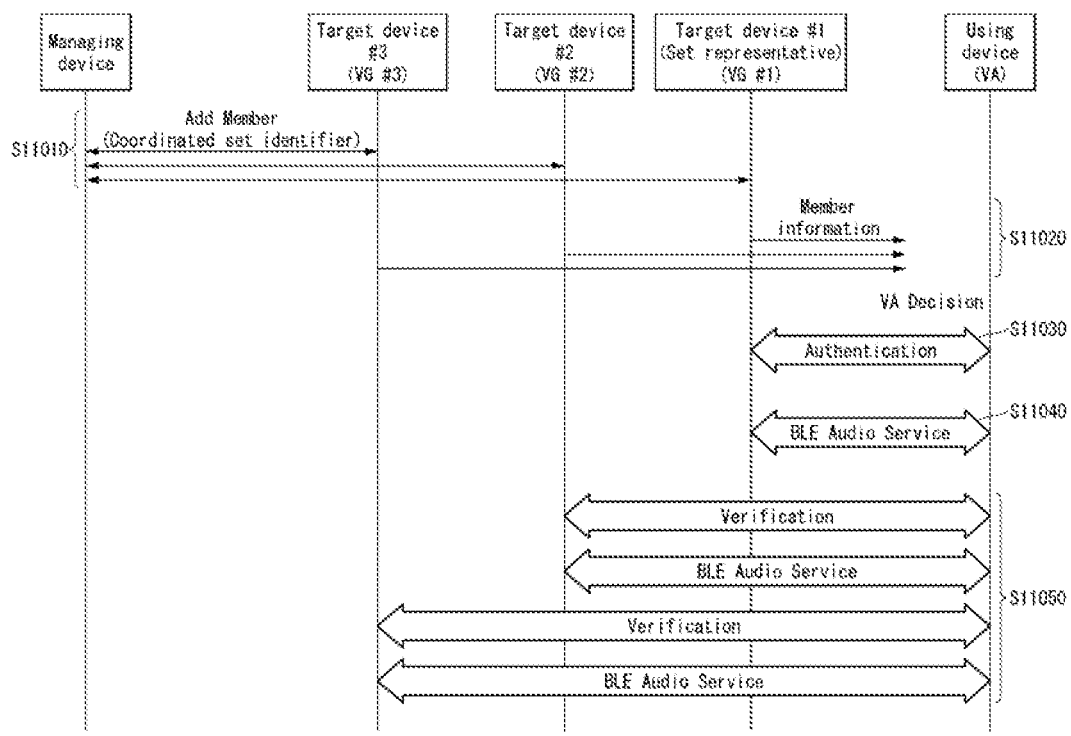

[FIG. 12]
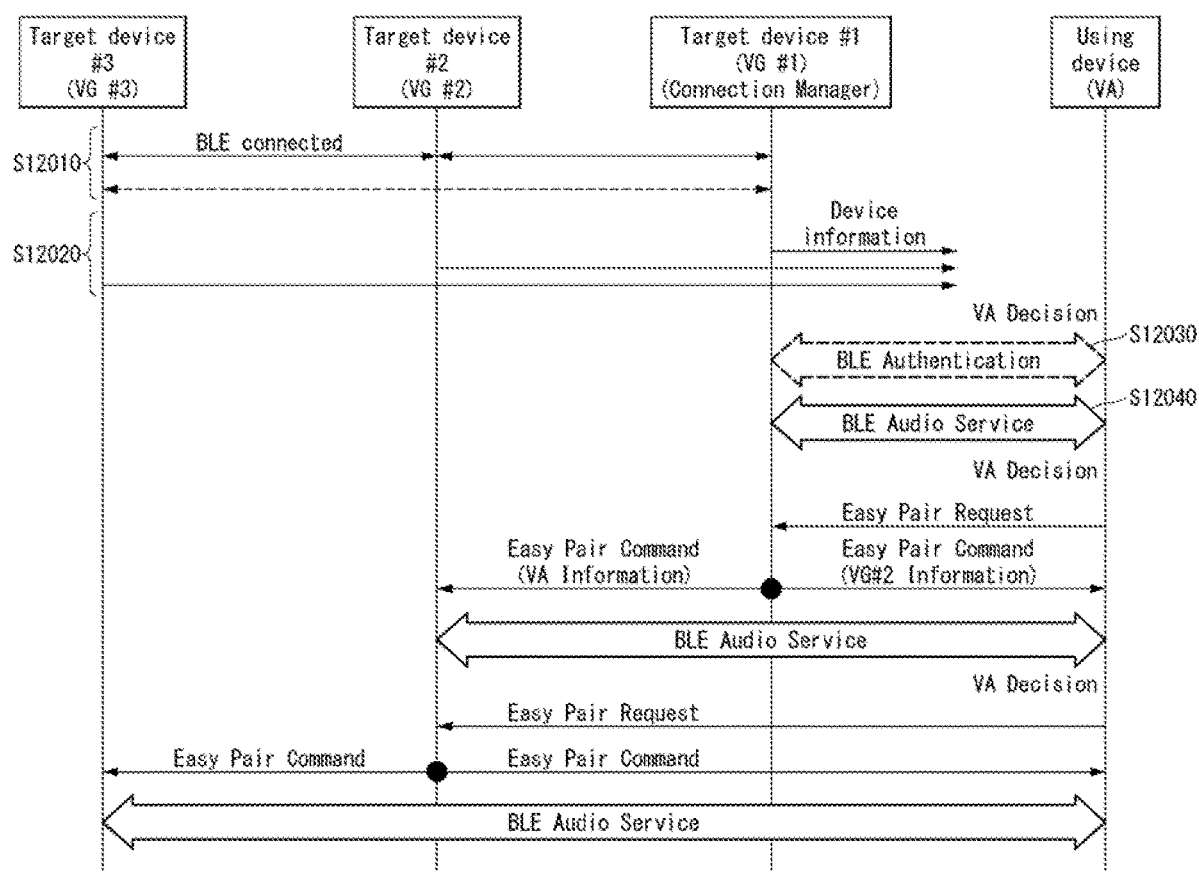

[FIG. 13]
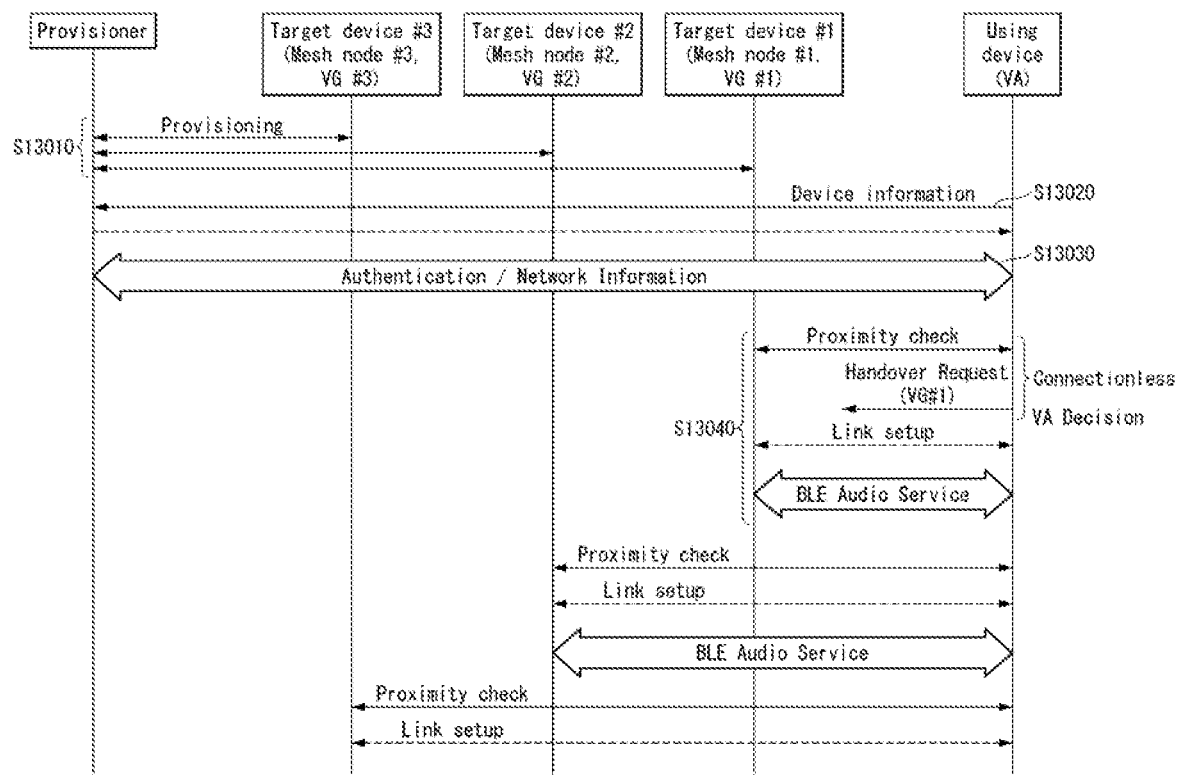

[FIG. 14]
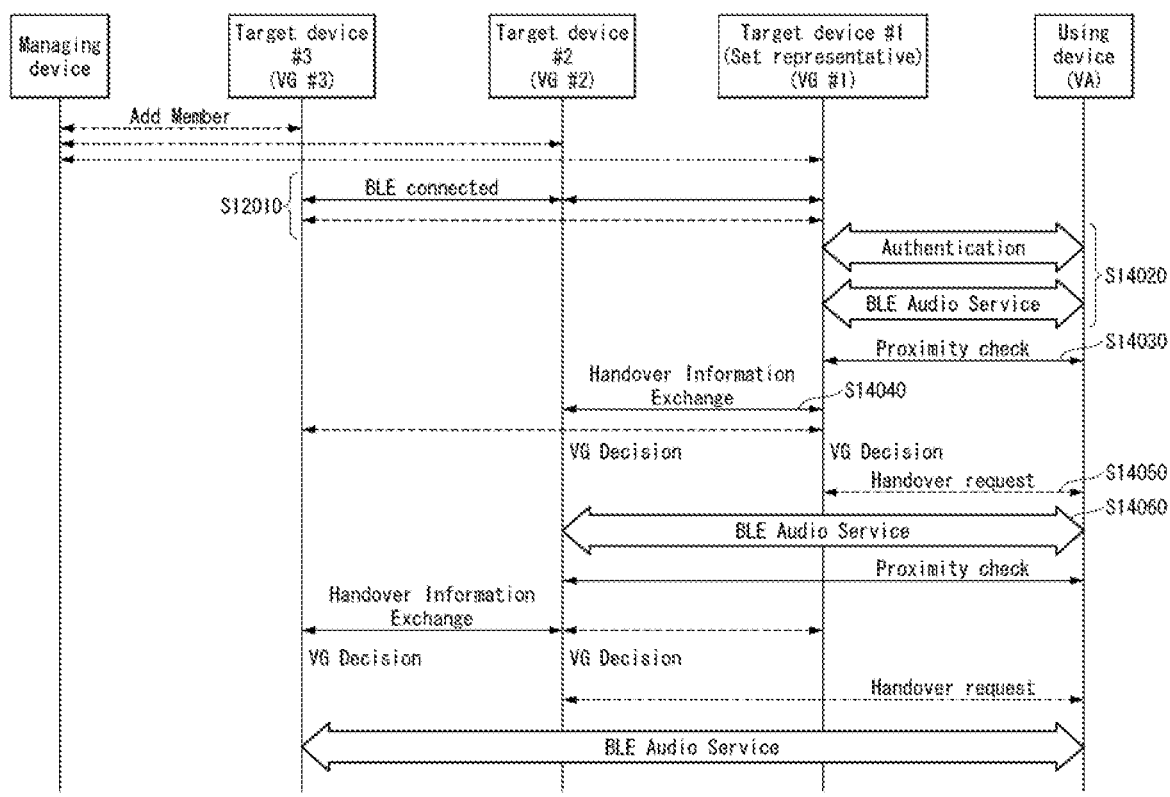

[FIG. 15]
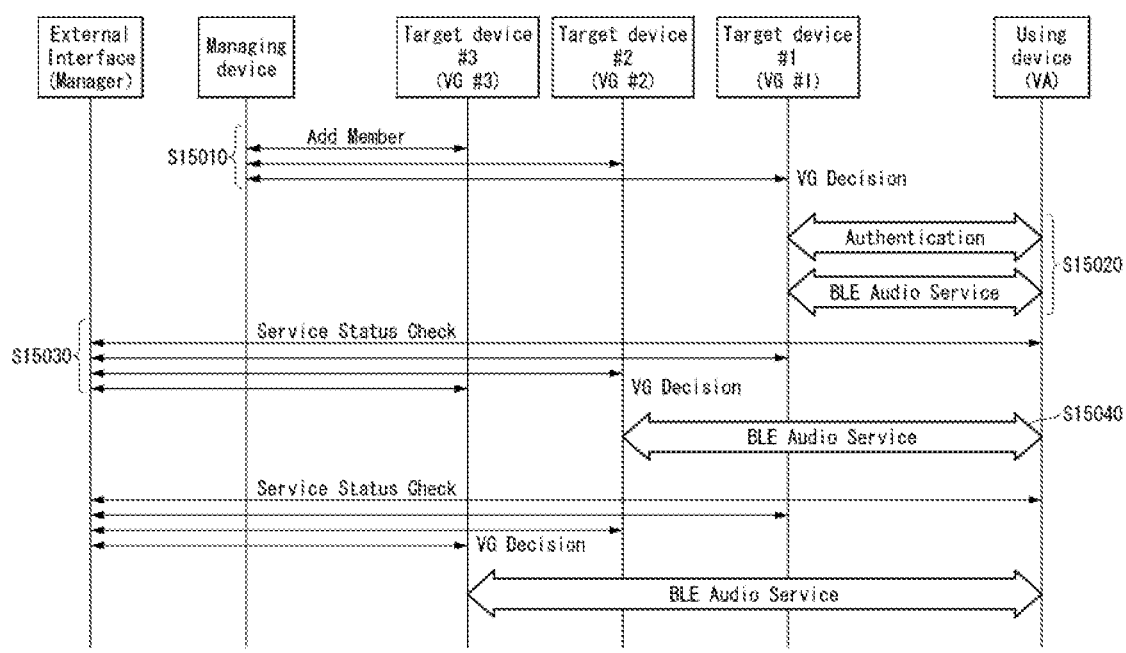

[FIG. 16]
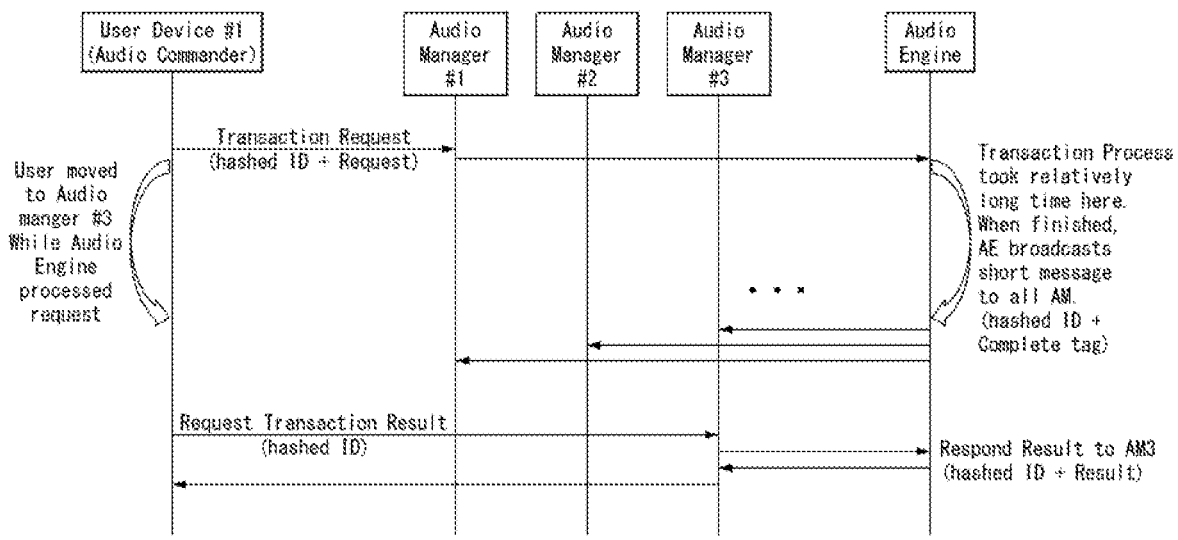

[FIG. 17]
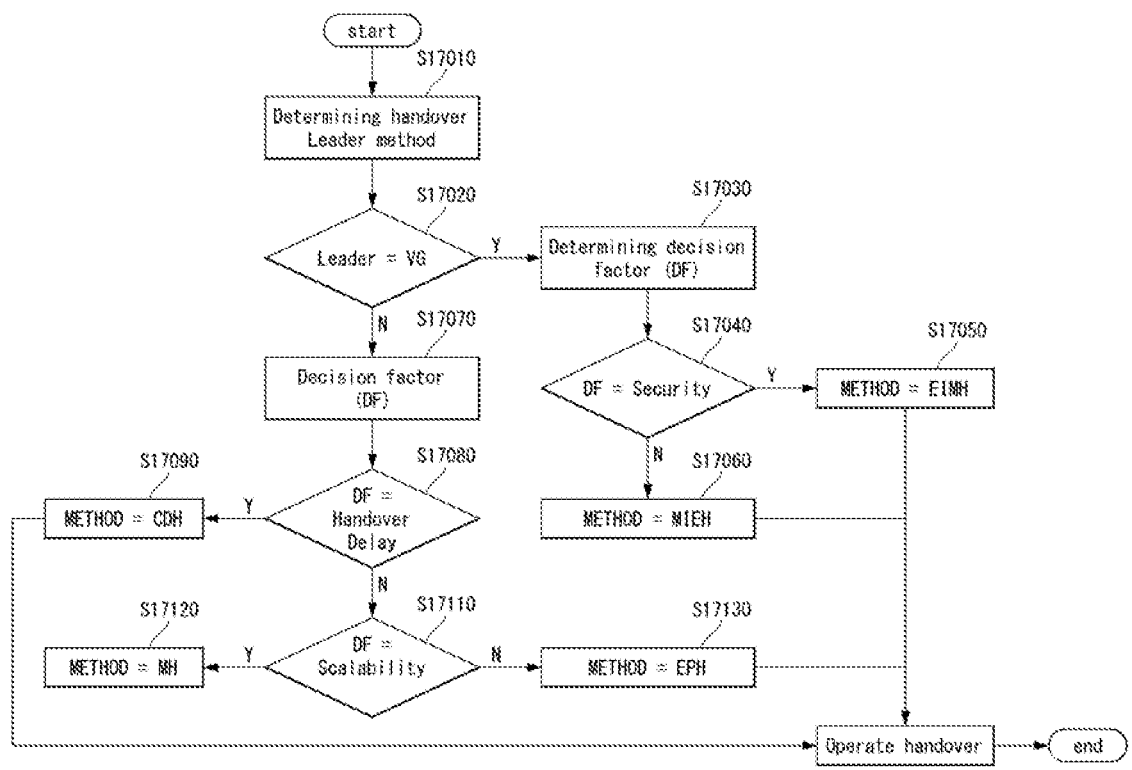

[FIG. 18]
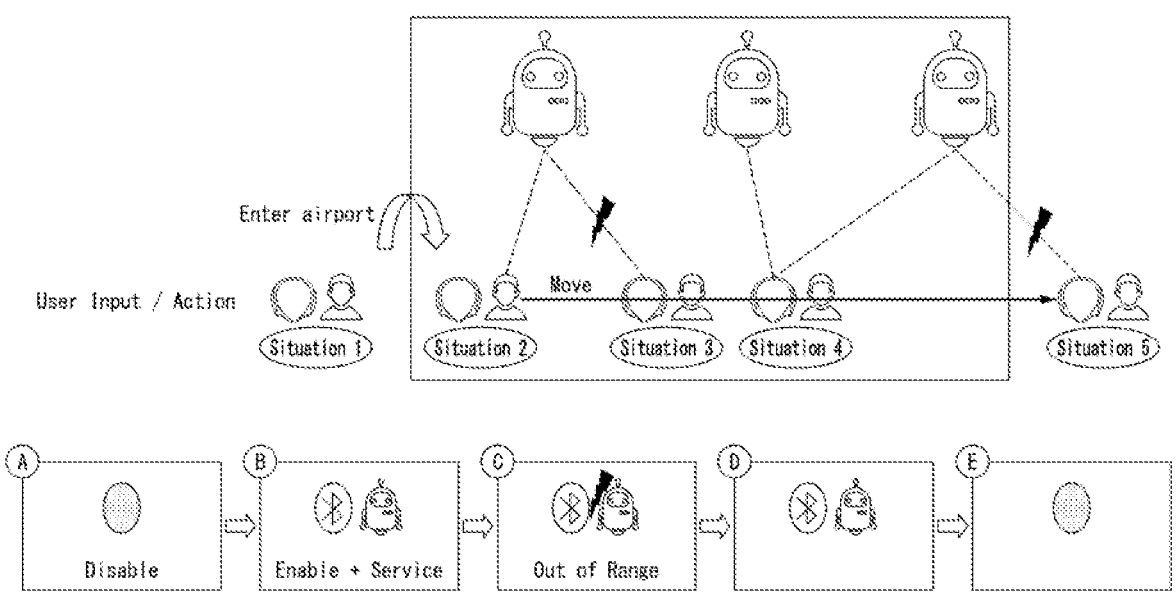

METHOD FOR PERFORMING HANDOVER BY USING BLUETOOTH IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2019/001233, filed on Jan. 29, 2019, which claims the benefit of U.S. Provisional Application No. 62/623,524, filed on Jan. 29, 2018, the contents of which are all hereby incorporated by reference herein in their entirety.

TECHNICAL FIELD

The present disclosure relates to a method and device for performing handover using Bluetooth that is a short-range communication technology in a wireless communication system.

BACKGROUND ART

Bluetooth is a short-range wireless technology standard by which various devices can be wirelessly connected to exchange data in a short range. When wireless communication between two devices is performed using Bluetooth, a user performs a procedure of discovering Bluetooth devices with which the user intends to communicate and requesting connection. In the present disclosure, a device may refer to equipment or an apparatus.

Here, the user can discover Bluetooth devices according to a Bluetooth communication method to be used by using a Bluetooth device and then perform connection.

Bluetooth communication methods include Basic Rate/Enhanced Data Rate (BR/EDR) method and Low Energy (LE). BR/EDR may be called Bluetooth classic. The Bluetooth classic includes a Bluetooth technique used since Bluetooth 1.0 using a basic rate and a Bluetooth technique using an enhanced data rate supported from Bluetooth 2.0.

Bluetooth low energy (hereinafter referred to as LE) used since Bluetooth 4.0 can stably provide information of hundreds of kilobyte (KB) using low power. In such Bluetooth low energy, information is exchanged between devices using an attribute protocol. This Bluetooth LE can reduce overhead of a header and simplify operations to decrease energy consumption.

Bluetooth devices include products without a display or a user interface. Complexity of connection/management/control/disconnection of various types of Bluetooth devices, and among them, Bluetooth devices to which similar technologies are applied is increasing.

Although Bluetooth can provide a relatively high speed using relatively low power and low cost, it has a limited transmission distance of a maximum of 100 m, in general, and thus can be suitable for being used in a limited space.

DISCLOSURE

Technical Problem

An object of the present disclosure is to provide a method and device for performing handover using Bluetooth.

In addition, an object of the present disclosure is to provide seamless communication even when a Bluetooth device moves by performing handover using Bluetooth.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present specification provides a method for performing handover in Bluetooth.

Specifically, a method by which a user device performs a handover in a wireless communication system includes the steps of: performing Bluetooth connection with a first target device on the basis of first authentication information; measuring a first link state between the user device and the first target device; measuring a second link state between the user device and a second target device; determining whether to perform a handover to the second target device on the basis of the first link state and the second link state; and performing a Bluetooth connection procedure with the second target device when execution of the handover to the second target device is determined, wherein second authentication information for the Bluetooth connection procedure with the second target device is the same as the first authentication information for Bluetooth connection with the first target device.

Further, in the present specification, the step of determining whether to perform a handover includes determining a handover to the second target device by comparing the first link state and the second link state with a predetermined threshold value.

Further, in the present specification, the first target device and the second target device are set to a single group, and the first authentication information is shared by the first target device and the second target device.

Further, in the present specification, the method further includes a step of receiving information about the second target device from the second target device when execution of the handover to the second target device is determined, wherein the information about the second target device includes the first authentication information and a group identifier, and the step of performing a Bluetooth connection procedure with the second target device includes the steps of: confirming whether the second target device and the first target device belong to the same group on the basis of the group identifier; and performing a Bluetooth connection procedure with the second target device when the first target device and the second target device belong to the same group.

Further, in the present specification, a method by which a user device performs a handover in a wireless communication system includes the steps of: performing Bluetooth connection with a first target device on the basis of first authentication information; receiving a handover request message from the first target device or a second target device, the handover request message being a message transmitted from an external device to the first target device or the second target device on the basis of a first link state between the first target device and the user device and a second link state between the second target device and the user device; receiving second authentication information for Bluetooth connection with the second target device on the basis of the handover request message from the external device; and performing a Bluetooth connection procedure with the second target device on the basis of the second authentication information, wherein the second authentication information for the Bluetooth connection procedure with the second target device is the same as the first authentication information for Bluetooth connection with the first target device.

Further, in the present specification, the first authentication information is received by an external device from the first target device or the user device and shared by the external device, the first target device and the second target device.

Further, in the present specification, the method further includes a step of outputting a user interface (UI) indicating that the user device is connected by Bluetooth when the user device is performing Bluetooth communication with the first target device.

Further, in the present specification, the method further includes a step of outputting a user interface (UI) indicating that Bluetooth connection is not available for the user device when the user device does perform Bluetooth communication with the first target device and the second target device.

Further, in the present specification, the UI indicating that the user device is connected by Bluetooth and the UI indicating that Bluetooth connection is not available correspond to at least one of a voice message, a pop-up message, SMS and an image.

Further, in the present specification, a user device performing a handover in Bluetooth includes: a communication unit for communicating with an external device in a wireless or wired manner; a memory for storing data; and a processor functionally connected to the communication unit, wherein the processor is configured to: perform Bluetooth connection with a first target device on the basis of first authentication information; measure a first link state between the user device and the first target device; measure a second link state between the user device and a second target device; determine whether to perform a handover to the second target device on the basis of the first link state and the second link state; and perform a Bluetooth connection procedure with the second target device when execution of the handover to the second target device is determined, wherein second authentication information for the Bluetooth connection procedure with the second target device is the same as the first authentication information for Bluetooth connection with the first target device.

Further, in the present specification, the processor determines the handover to the second target device by comparing the first link state and the second link state with a predetermined threshold value.

Further, in the present specification, the processor outputs a user interface (UI) indicating that the user device is connected by Bluetooth when the user device is performing Bluetooth communication with the first target device.

Further, in the present specification, the processor outputs a user interface (UI) indicating that Bluetooth connection is not available for the user device when the user device does perform Bluetooth communication with the first target device and the second target device.

Advantageous Effects

Th present disclosure has the effect of efficient short-range communication by performing handover using Bluetooth.

Furthermore, the present disclosure can perform seamless communication even when a Bluetooth device moves by performing handover using Bluetooth.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a schematic diagram illustrating an example of a wireless communication system using Bluetooth LE proposed in the present specification.

FIG. 2 illustrates an example of internal block diagrams of devices which can realize methods proposed in the present specification.

FIG. 3 is a diagram illustrating an example of Bluetooth communication architecture to which methods proposed in the present specification are applicable.

FIG. 4 is a diagram illustrating an example of a generic attribute profile (GATT) structure of Bluetooth LE.

FIG. 5 is a flowchart illustrating an example of a connecting procedure method in Bluetooth LE to which the present disclosure is applicable.

FIG. 6 is a schematic diagram illustrating an example of a Bluetooth mesh network to which the present disclosure is applicable.

FIG. 7 is a flowchart illustrating an example of a method by which a device to which the present disclosure is applicable joins in a Bluetooth mesh network.

FIG. 8 is a diagram illustrating coordination of devices entities proposed in the present specification.

FIG. 9(a) and (b) are diagrams illustrating procedures for authentication and verification of coordination of devices.

FIG. 10 is a diagram illustrating easy pairing according to the present specification.

FIG. 11 is a diagram illustrating an example of a method for performing handover using Bluetooth proposed in the present specification.

FIG. 12 is a diagram illustrating another example of the method for performing handover using Bluetooth proposed in the present specification.

FIG. 13 is a diagram illustrating another example of the method for performing handover using Bluetooth proposed in the present specification.

FIG. 14 is a diagram illustrating another example of the method for performing handover using Bluetooth proposed in the present specification.

FIG. 15 is a diagram illustrating another example of the method for performing handover using Bluetooth proposed in the present specification.

FIG. 16 is a diagram illustrating a method for performing a transaction protocol.

FIG. 17 is a diagram illustrating an algorithm of determining a specific one of handover methods of methods 1 to 5.

FIG. 18 is a diagram illustrating user interfaces (UIs) that can be displayed on a user device when handover operations of the methods 1 to 5 are performed.

MODE FOR INVENTION

Hereinafter, preferred embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Hereinafter, methods and devices pertaining to the present disclosure will be described in detail with reference to the attached drawings. The suffixes "module" and "unit" of elements herein are used for convenience of description and thus can be used interchangeably and do not have any distinguishable meanings or functions.

FIG. 1 is a schematic diagram illustrating an example of a wireless communication system using Bluetooth LE proposed in the present specification.

A wireless communication system 100 includes at least one server device 120 and at least one client device 110.

A service device and a client device perform Bluetooth communication using Bluetooth low energy (hereinafter referred to as 'BLE' for convenience).

First, BLE has a relatively low duty cycle, allows production with low cost and considerably reduces power consumption through a low data transfer rate, as compared to Bluetooth basic rate/enhanced data rate (BR/EDR), and thus operation can be performed for one year or longer when a coin cell battery is used.

In addition, in BLE, a procedure of connecting devices is simplified and a packet size is designed to be smaller than that of Bluetooth BR/EDR.

In BLE, (1) the number of RF channels is 40, (2) a data transfer rate of 1 Mbps is supported, (3) topology is a scatternet structure, (4) latency is 3 ms, (5) maximum current is 15 mA or less, (6) output power is 10 mW (10 dBm) or less, and (7) BLE is used for applications of cellular phones, watches, sports, healthcare, sensors, and device control.

The server device 120 can operate as a client device with respect to other devices, and the client device can operate as a server device with respect to other devices. That is, in a BLE communication system, a device can operate as a server device or a client device and operate as both a server device and a client device as necessary.

The server device 120 may also be referred to as a data service device, a slave device, a slave, a server, a conductor, a host device, a gateway, a sensing device, a monitoring device, or the like.

The client device 110 may also be referred to as a master device, a master, a client, a member, a sensor device, a sink device, a collector, a third device, a fourth device, or the like.

The server device and the client device correspond to main components of the wireless communication system, and the wireless communication system may include other components in addition to the server device and the client device.

The server device refers to a device which receives data from a client device, directly communicates with the client device, and provides data to the client device in response to a data request received from the client device.

In addition, the server device transmits a notification message and an indication message to the client device in order to provide data information to the client device. Further, when the server device transmits an indication message to the client device, the server device receives a confirmation message corresponding to the indication message from the client device.

Further, the server device may provide data information to a user through a display unit or receive a request from the user through a user input interface in processes of transmitting/receiving notification, indication and confirmation messages to/from the client device.

In addition, the server device may read data from a memory unit or write new data in the memory in processes of transmitting/receiving messages to/from the client device.

Further, a single server device may be connected to multiple client devices and may be easily re-connected to (or may access) client device using bonding information.

The client device 120 refers to a device which requests data information and data transmission from a server device.

The client device receives data from the server device through a notification message, an indication message, and the like and transmits a confirmation message in response to the indication message to the server device upon reception of the indication message from the server device.

The client device may also provide information to a user through a display unit or receive an input from the user through a user input interface in processes of transmitting/receiving messages to/from the server device.

In addition, the client device may read data from a memory unit or write new data in the memory in processes of transmitting/receiving messages to/from the server device.

Hardware components such as display units, user input interfaces and memory units of the server device and the client device will be described in detail with reference to FIG. 2.

The wireless communication system may constitute personal area networking (PAN) through Bluetooth. For example, in the wireless communication system, files, documents and the like can be exchanged rapidly and safely between devices through a private piconet established between the devices.

FIG. 2 illustrates examples of internal block diagrams of devices capable or realizing methods proposed in the present specification.

As illustrated in FIG. 2, a server device includes a display unit 111, a user input interface 112, a power supply unit 113, a processor 114, a memory unit 115, a Bluetooth interface 116, another interface 117, and a communication unit (or transceiver) 118.

The display unit 111, the user input interface 112, the power supply unit 113, the processor 114, the memory unit 115, the Bluetooth interface 116, the other interface 117, and the communication unit 118 are functionally connected to perform methods proposed in the present specification.

A client device includes a display unit 121, a user input interface 122, a power supply unit 123, a processor 124, a memory unit 125, a Bluetooth interface 126, and a communication unit (or transceiver) 127.

The display unit 121, the user input interface 122, the power supply unit 123, the processor 124, the memory unit 125, the Bluetooth interface 126, and the communication unit 127 are functionally connected to perform methods proposed in the present specification.

The Bluetooth interfaces 116 and 126 refer to units (or modules) capable of transmitting requests/responses, commands, notification and indication/confirmation messages or data between devices using Bluetooth.

The memory units 115 and 125 refer to units implemented in various types of devices and stores various types of data.

The processors 114 and 124 refer to modules which control overall operations of the server device and the client device and control the server device and the client device such that message transmission is requested and received messages are processed through the Bluetooth interfaces and other communication interfaces.

The processors 114 and 124 may also be referred to as controllers, control units, or the like.

The processors 114 and 124 may include an application-specific integrated circuit (ASIC), other chipsets, a logic circuit and/or a data processing device.

The processors 114 and 124 control the communication units such that an advertising message is received from the server device, control the communication units such that a scan request message is transmitted to the server device and a scan response message is received from the server device in response to the scan request, and control the communication units such that a connect request message is transmitted to the server device to establish Bluetooth connection with the server device.

Further, the processors 114 and 124 control the communication units such that data is read from the server device or written using an attribute protocol after Bluetooth LE connection is established through the aforementioned connection procedure.

The memory units 115 and 125 may include a read-only memory (ROM), a random access memory (RAM), a flash memory, a memory card, a storage medium and/or other storage devices.

The communication units 118 and 127 may include a baseband circuit for processing radio signals. When an embodiment is realized by software, the aforementioned method may be realized by modules (processes, functions, etc.) which perform the aforementioned functions. A module may be stored in a memory unit and executed by a processor.

The memory units 115 and 125 may be provided inside or outside the processors 114 and 124 and connected to the processors 114 and 124 through various known means.

The display units 111 and 121 refer to modules for providing state information, message exchange information and the like of the devices to a user through screens.

The power supply units 113 and 123 refer to modules which receive external power and internal power under the control of controllers and supply power necessary for operation of each component.

As described above, BLE has a low duty cycle and can considerably reduce power consumption through a low data transfer rate.

The user input interfaces 112 and 122 refer to modules which provide user input to controllers such that a user can control device operation, such as screen buttons.

FIG. 3 is a diagram illustrating an example of Bluetooth communication architecture to which methods proposed in the present specification are applicable.

Referring to FIG. 3, (a) of FIG. 3 illustrates an example of a protocol stack of Bluetooth Basic Rate/Enhanced Data Rate (BR/EDR) and (b) illustrates an example of a protocol stack of Bluetooth Low Energy (LE).

Specifically, as illustrated in (a) of FIG. 3, the Bluetooth BR/EDR protocol stack may include an upper controller stack 10 and a lower host stack 20 on the basis of a host controller interface (HCI) 18.

The host stack (or host module) 20 refers to a wireless transmission/reception module which receives 2.4 GHz Bluetooth signals and hardware for transmitting or receiving Bluetooth packets and is connected to a Bluetooth module that is the controller stack 10 to control the Bluetooth module and perform operations.

The controller stack 10 may include a PHY layer 12, a link controller 14 and a link manager 16.

The PHY layer 12 is a layer which transmits/receives 2.4 GHz radio signals and can transmit data while hopping 79 RF channels when GFSK (Gaussian Frequency Shift Keying) modulation is used.

The link controller 14 serves to transmit digital signals, selects a channel sequence hopping 1600 times per second, and transmits a time slot of 625 µs per channel.

The link manager 16 controls overall operation (link setup, control and security) of Bluetooth connection using a link manager protocol (LMP).

The link manager 16 can execute the following functions.

ACL/SCO logical transport, logical link setup and control

Detach: connection is suspended and a companion device is notified of the reason for suspension.

Power control and role switch

Security (authentication, pairing, encryption) functions

The host controller interface 18 provides an interface between the host module and the controller module such that a host can provide commands and data to a controller and the controller can provide events and data to the host.

The host stack (or host module) 20 includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 can provide a single bidirectional channel for transmitting data to a specific protocol or profile.

The L2CAP 21 can multiplex various protocols and profiles provided by a higher Bluetooth layer.

L2CAP of the Bluetooth BR/EDR uses a dynamic channel, supports a protocol service multiplexer, retransmission and a streaming mode, and provides segmentation, reassembly, per-channel flow control, and error control.

The GATT 23 can serve as a protocol which describes how the attribute protocol 22 is used when services are configured. For example, the GATT 23 can operate to define how ATT attributes are grouped into services and operate to describe features related to services.

Accordingly, the GATT 23 and the ATT 22 can use features in order to describe states of devices and services and describe how features are associated with each other and used.

The ATT 22 and the BR/EDR profile 25 define a service (profile) using Bluetooth BR/EDR and define an application protocol for transmitting/receiving data thereof, and the general access profile (GAP) 24 defines device discovery, connection, and security level.

As illustrated in (b) of FIG. 3, the Bluetooth LE protocol stack includes a controller stack 30 which can operate to process a wireless device interface for which timing is important, and a host stack 40 which can operate to process high-level data.

First, the controller stack 30 may be implemented using a communication module which can include a Bluetooth wireless device, for example, a processor module which can include a processing device such as a microprocessor.

The host stack may be implemented as a part of an OS operating on a processor module or as instance instantiation of a package on the OS.

In some examples, the controller stack and the host stack can operate or be executed on the same processing device in a processor module.

The controller stack 30 includes a physical layer (PHY) 32, a link layer 34 and a host controller interface 36.

The physical layer (PHY) (wireless transmission/reception module) 32 transmits/receives 2.4 GHz RF signals and uses a frequency hopping technique using GFSK (Gaussian Frequency Shift Keying) modulation and 40 RF channels.

The link layer 34 serving to transmit or receive Bluetooth packets and provides functions of generating connection between devices after executing advertising and scanning functions using three advertising channels, and transmitting/receiving data packets of a maximum of 257 bytes through 37 data channels.

The host stack may include a logical link control and adaptation protocol (L2CAP) 41, a security manager (SM) 42, an attribute protocol (ATT) 43, a general attribute profile (GATT) 44, a generic access profile 45, and an LE profile 46. However, the host stack 40 is not limited thereto and may include various protocols and profiles.

The host stack multiplexes various protocols and profiles provided by a higher Bluetooth layer using L2CAP.

First, the logical link control and adaptation protocol (L2CAP) 41 may provide a single bidirectional channel for transmitting data to a specific protocol or profile.

The L2CAP 41 can operate to multiplex data between higher layer protocols, segment and reassemble packages, and manage multicast data transmission.

In Bluetooth LE, three fixed channels (one fora signaling CH, one fora security manager, and one for an attribute protocol) are used by default. In addition, a dynamic channel may be used as necessary.

On the other hand, BR/EDT (Basic Rate/Enhanced Data Rate) uses a dynamic channel by default and supports a protocol service multiplexer, retransmission, a streaming mode, and the like.

The security manager (SM) 42 authenticates a device and takes charge of security of Bluetooth LE as a protocol for providing key distribution.

The attribute protocol (ATT) 43 defines a rule for accessing data of a companion device with a server-client structure. The ATT includes the following six message types (request, response, command, notification, indication and confirmation).

① Request and response messages: a request message is a message for requesting and transmitting specific information from a client device to a server device, and a response message is a response to the request message transmitted from the server device to the client device.

② Command message: a message transmitted from a client device to a server device to indicate a command fora specific operation. The server device does not transmit a response to the command message to the client device.

③ Notification message: a message transmitted from a server device to a client device for notification of an event or the like. The client device does not transmit a confirmation message for the notification message to the server device.

④ Indication and confirmation messages: messages transmitted from a server device to a client device for notification of an event or the like. A confirmation message for the indication message is transmitted from the client device to the server device unlike the notification message.

The generic access profile 45 is a layer newly realized for Bluetooth LE and is used to select a role for communication between Bluetooth LE devices and to control how multi-profile operations are performed.

In addition, the general access profile 45 is mainly used for device discovery, connection generation and security procedures, defines a scheme for providing information to a user and defines attribute types below.

① Service: defines basic operations of a device using a combination of behaviors related to data.

② Include: defines a relationship between services.

③ Characteristics: data values used for services

④ Behavior: a format defined as a UUID (Universal Unique Identifier, value type) and readable by a computer.

The LE profile 46 has dependency on GATT and is mainly applied to Bluetooth LE devices. The LE profile 46 may include, for example, Battery, Time, FindMe, Proximity, and Time, and GATT-based profiles are as follows.

① Battery: battery information exchange method

② Time: time information exchange method

③ Find Me: provision of an alarm service depending on distance

④ Proximity: battery information exchange method

⑤ Time: time information exchange method

The GATT 44 can operate as a protocol which describes how the attribute protocol 43 is used when services are configured. For example, the GATT 44 can operate to define how ATT attributes are grouped into services and operate to describe features related to services.

Accordingly, the GATT 44 and the ATT 43 can use features in order to describe states of devices and services and describe how features are associated with each other and used.

Hereinafter, procedures of BLE will be briefly described.

BLE procedures may be classified into a device filtering procedure, an advertising procedure, a scanning procedure, a discovering procedure, and a connecting procedure.

Device Filtering Procedure

The device filtering procedure is a method for reducing the number of devices performing response to request, indication and notification in the controller stack.

When all devices receive requests, it is unnecessary to respond to the requests. Accordingly, the controller stack can reduce the number of request transmissions such that power consumption can decrease in the BLE controller stack.

An advertising device or a scanning device can perform the device filtering procedure in order to restrict devices that receive advertising packets, scan requests or connection requests.

Here, the advertising device refers to a device that transmits an advertising event, that is, performs advertisement and may also be referred to as an advertiser.

The scanning device refers to a device that performs scanning or a device that transmits a scan request.

In BLE, when a scanning device receives some advertising packets from an advertising device, the scanning device needs to transmit a scan request to the advertising device.

However, when the device filtering procedure is used and thus scan request transmission is not necessary, the scanning device can ignore advertising packets transmitted from the advertising device.

The device filtering procedure may be used in a connection request process. If device filtering is used in the connection request process, it is not necessary to transmit a response to a connection request by ignoring the connection request.

Advertising Procedure

An advertising device performs the advertising procedure in order to perform nondirectional broadcast to devices in an area.

Here, nondirectional broadcast refers to omnidirectional broadcast not broadcast in a specific direction.

On the other hand, directional broadcast refers to broadcast in a specific direction. Nondirectional broadcast occurs without a connection procedure between an advertising device and a device in a listening state (hereinafter referred to as a listening device).

The advertising procedure is used to establish Bluetooth connection with a neighboring initiation device.

Alternatively, the advertising procedure may be used to provide periodic broadcast of user data to scanning devices performing listening in an advertising channel.

In the advertising procedure, all advertisements (or advertising events) are broadcast through an advertising physical channel.

Advertising devices may receive scan requests from listening devices performing listening in order to obtain additional user data from advertising devices. Advertising devices transmit responses to scan requests to devices that have transmitted the scan requests through the same advertising physical channel through which the scan requests have been received.

Broadcast user data transmitted as a part of advertising packets is dynamic data, whereas scan response data is generally static data.

An advertising device may receive a connection request from an initiation device over an advertising (broadcast) physical channel. If the advertising device uses a connectable advertising event and the initiation device is not filtered through the device filtering procedure, the advertising device stops advertisement and enters a connected mode. The advertising device can resume the advertisement after the connected mode.

Scanning Procedure

A device performing scanning, that is, a scanning device, performs the scanning procedure in order to listen to nondirectional broadcast of user data from advertising devices using advertising physical channels.

The scanning device transmits a scan request to an advertising device through an advertising physical channel in order to request additional data from the advertising device. The advertising device transmits a scan response including the additional data requested by the scanning device through the advertising physical channel in response to the scan request.

The scanning procedure may be used during connection with another BLE device in a BLE piconet.

If the scanning device is in an initiator mode in which the scanning device can receive a broadcast advertising event and initiate a connection request, the scanning device can initiate Bluetooth connection with an advertising device by transmitting a connection request to the advertising device through an advertising physical channel.

When the scanning device transmits a connection request to an advertising device, the scanning device stops initiator mode scanning for additional broadcast and enters the connected mode.

Discovering Procedure

Devices capable of performing Bluetooth communication (hereinafter referred to as 'Bluetooth devices') perform the advertising procedure and the scanning procedure in order to discover neighboring devices or to be discovered by other devices in a given area.

The discovering procedure is asymmetrically performed. A Bluetooth device that intends to discover a neighboring device is referred to as a discovering device which listens in order to discover devices which advertise scannable advertising events. A Bluetooth device which is discovered by other devices and used thereby is referred to as a discoverable device which actively broadcasts advertising events through an advertising (broadcast) physical channel such that other devices can scan the discoverable device.

Both the discovering device and the discoverable device may already be connected with other Bluetooth devices in a piconet.

Connecting Procedure

The connecting procedure is asymmetrical and requires a Bluetooth device to perform the scanning procedure while a specific Bluetooth device performs the advertising procedure.

That is, the advertising procedure can be the aim, and as a result, only one device will respond to advertisement. After an accessible advertising event is received from an advertising device, connection can be initiated by transmitting a connection request to the advertising device through an advertising (broadcast) physical channel.

Next, operation states in BLE, that is, an advertising state, a scanning state, an initiating state, and a connection state will be briefly described.

Advertising State

A link layer (LL) enters an advertising state according to an instruction of a host (stack). When the link layer is in the advertising state, the link layer transmits packet data units (PDUs) in advertising events.

Each advertising event is composed of one or more advertising PDUs, and the advertising PDUs are transmitted through advertising channel indexes. When advertising PDUs have been transmitted through advertising channel indexes, an advertising event may end, or when the advertising device needs to secure a space in order to execute another function, may end earlier.

Scanning State

A link layer enters a scanning state according to an instruction of the host (stack). In the scanning state, the link layer listens to advertising channel indexes.

The scanning state includes two types of passive scanning and active scanning, and each scanning type is determined by the host.

An additional time or advertising channel index for performing scanning is not defined.

In the scanning state, the link layer listens to advertising channel indexes for a scanWindow duration. A scanInterval is defined as an interval between start points of two consecutive scan windows.

When there is no scheduling collision, the link layer needs to listen for completion of all scan intervals of scan windows as indicated by the host. In each scan window, the link layer needs to scan other advertising channel indexes. The link layer uses all available advertising channel indexes.

In the case of passive scanning, the link layer receives only packets and cannot transmit any packet.

In the case of active scanning, the link layer performs listening in order to depend on an advertising PDU type by which advertising PDUs and additional information related to an advertising device can be requested to the advertising device.

Initiating State

A link layer enters an initiating state according to an instruction of the host (stack).

When the link layer is in the initiating state, the link layer performs listening to advertising channel indexes.

In the initiating state, the link layer listens to advertising channel indexes for a scanWindow duration.

Connection State

A link layer enters a connection state when a device performing a connection request, that is, an initiating device, transmits CONNECT_REQ PDU to an advertising device or the advertising device receives CONNECT_REQ PDU from the initiating device.

After entering the connection state, connection is considered to be generated. However, connection need not be considered to be established at the time of entering the connection state. A unique difference between newly generated connection and previously established connection is a link layer connection supervision timeout value.

When two devices have been connected, the two devices play different roles.

A link layer serving as a master is called a mater and a link layer serving as a slave is called a slave. The master controls a timing of a connection event, and the connection event refers to a time at which the master and the slave are synchronized with each other.

Hereinafter, packets defined in the Bluetooth interface will be briefly described. BLE devices use packets defined below.

Packet Format

A link layer has only one packet format used for both an advertising channel packet and a data channel packet.

Each packet includes four fields of a preamble, an access address, a PDU, and a CRC.

A PDU will be an advertising channel PDU when a single packet is transmitted over an advertising physical channel, and a PDU will be a data channel PDU when a single packet is transmitted over a data physical channel.

Advertising Channel PDU

An advertising channel PDU has a 16-bit header and a payload having various sizes.

A PDU type field of an advertising channel PDU included in the header represents PDU types as defined in Table 1.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Adverting PDU

The following advertising channel PDU types are called advertising PDUs and used in specific events.

ADV_IND: connectable nondirectional advertising event

ADV_DIRECT_IND: connectable directional advertising event

ADV_NONCONN_IND: nonconnectable nondirectional advertising event

ADV_SCAN_IND: scannable nondirectional advertising event

The aforementioned PDUs are transmitted in a link layer in an advertising state and received by the link layer in a scanning state or an initiating state.

Scanning PDU

The following advertising channel PDU types are called scanning PDUs and used in states described below.

SCAN_REQ: transmitted by a link layer in a scanning state and received by the link layer in an advertising state.

SCAN_RSP: transmitted by a link layer in an advertising state and received by the link layer in a scanning state.

Initiating PDU

The following advertising channel PDU type is called an initiating PDU.

CONNECT_REQ: transmitted by a link layer in an initiating state and received by the link layer in an advertising state.

Data Channel PDU

A data channel PDU has a 16-bit header and a payload having various sizes and may include a message integrity check (MIC) field.

The above-described procedures, states and packet formats in BLE can be applied in order to perform methods proposed in the present specification.

FIG. 4 is a diagram illustrating an example of a generic attribute profile (GATT) structure of BLE.

FIG. 4 illustrates a structure for profile data exchange in BLE.

Specifically, GATT defines a method for transmitting and receiving data using services and characteristics between Bluetooth LE devices.

In general, a peripheral device (e.g., a sensor device) serves as a GATT server and has definition of services and characteristics, and a central device serves as a GATT client.

The GATT client transmits a data request to the GATT server in order to read or write data, and all transactions start by the GATT client and responses are received from the GATT server.

A GATT based transaction structure used in BLE is based on a profile, a service and a characteristic and may construct a vertical structure as shown in FIG. 5.

The aforementioned profile may be composed of one or more services and the aforementioned service may be composed of one or more characteristics or other services.

The service serves to divide data into logical units and may include one or more characteristics or other services. Each service has a 16-bit or 128-bit identifier called a universal unique identifier (UUID).

The aforementioned characteristic is a lowest unit in the GATT based transaction structure. The characteristic includes only one piece of data and has a 16-bit or 128-bit UUID like the service.

The characteristic is defined by various information values and requires an attribute in order to contain each piece of information. The characteristic may use multiple consecutive attributes.

The attribute is composed of four components and has the meanings as follows.

Handle: attribute address

Type: attribute type

Value: attribute value

Permission: permission to access attribute

FIG. 5 is a flowchart illustrating an example of a connecting procedure in Bluetooth LE to which the present disclosure is applicable.

A server transmits an advertising message to a server through three advertising channels (S5010).

The server may be called an advertiser before connection and called a master after connection. An example of the server may be a sensor (temperature sensor or the like).

Further, the client may be called a scanner before connection and called a slave after connection. An example of the client may be a smartphone.

As described above, Bluetooth performs communication using a total of 40 channels through a 2.4 GHz band. Three of the 40 channels are advertising channels which are used for exchange of packets transmitted and received for establishing connection including various advertising packets.

The remaining 37 channels are used for data exchange after connection to a data channel.

After reception of the advertising message, the client may transmit a scan request message to the server in order to acquire additional data (e.g., a server device name and the like).

In this case, the server transmits a scan response message including the additional data to the client in response to the scan request message.

Here, the scan request message and the scan response message are a type of the advertising packet, and the advertising packet may include only user data of 31 bytes or less.

Accordingly, when data having a size greater than 3 bytes but having overhead large to be transmitted through connection is present, the data is divided and transmitted in twice using the scan request message/scan response message.

Next, the client transmits a connection request message for setting Bluetooth connection with the server to the server (S5020).

Accordingly, link layer (LL) connection is established between the server and the client.

Thereafter, the server and the client perform a security establishment procedure.

The security establishment procedure may be interpreted as secure simple pairing or may include the same.

That is, the security establishment procedure can be performed through phase 1 to phase 3.

Specifically, a pairing procedure (Phase 1) is performed between the server and the client (S5030).

In the pairing procedure, the client transmits a pairing request message to the server and the server transmits a pairing response message to the client.

Authentication requirements, input/output (I/O) capabilities and key size information are exchanged between the devices through the pairing procedure. This information is used to determine a key generation method to be used in Phase 2.

Subsequently, in Phase 2, legacy pairing or secure connection is performed between the server and the client (S5040).

In Phase 2, a 128-bit temporary key and a short term key (STK) for legacy pairing are generated.

Temporary Key: key created to generate STK

Short Term Key (STK): a key value used to establish encrypted connection between devices If secure connection is performed in Phase 2, a 128-bit long term key (LTK) is generated.

Long Term Key (LTK): a key value used for not only encrypted connection between devices but also later connection.

Subsequently, in SSP Phase 3, a key distribution procedure is performed between the server and the client (S5050).

Accordingly, secure connection is established between the server and the client and an encrypted link is established such that data can be transmitted and received.

Hereinafter, a method for transmitting/receiving a long attribute value will be described.

The longest attribute that can be transmitted as a single packet is ATT_MTU-1 octet. Here, ATT_MTU refers to a maximum size of a packet transmitted between a client and a server.

At least an attribute Opcode is included in an attribute PDU. An attribute value may be defined as a value greater than the ATT_MTU-1 octet and this attribute is referred to as a long attribute.

To read the entire value of an attribute greater than ATT_MTU-1 octet, a read blob request message is used. The first ATT_MTU-1 octet of a long attribute value can be read using the read blob request message.

To write the entire value of an attribute greater than ATT_MTU-3 octet, a preparatory write request message and an execution write request message may be used. The first ATT_MTU-3 octet of a long attribute value can be written using a write request message.

It is difficult to determine whether an attribute value is longer than ATT_MTU-3 octet using a specific protocol. Higher layer specification specifies that a given attribute can have a maximum length longer than ATT_MTU-3 octet.

A maximum length of an attribute value is 512 octets. That is, a maximum length of data that can be stored in a single characteristic is 512 octets.

However, when data exceeding the maximum length which can be stored in a single characteristic is generated, a method for transmitting/receiving the data through ATT protocol is not present.

Accordingly, to solve this problem, the present disclosure proposes a method for dividing data and transmitting/receiving the data through a single characteristic when the data exceeds a maximum length which can be stored in a single characteristic.

FIG. 6 is a schematic diagram illustrating an example of a Bluetooth mesh network to which the present disclosure is applicable.

As illustrated in FIG. 6, the mesh network refers to a network in which multiple devices are connected in a mesh through Bluetooth to transmit/receive data.

The Bluetooth mesh network includes multiple relay nodes which relay messages between a source device 200 that transmits data and a destination device 400 that receives the data.

Nodes may be classified into edge nodes 200 and 400 and a relay node.

In the present disclosure, the term 'node' refers to a device constituting the mesh network and 'node' and 'device' can be interchangeably used.

Each node includes a message cache of a recently received message. If a received message is present in a message cache, the message is not relayed.

However, if the received message is not present in a message cache, the message is relayed and stored in a message cache.

An edge node is generally provided with power through a battery, is normally in a slip state and may interact or periodically wake up.

The edge node can process a received message when the following conditions are satisfied.

A message is not present in a message cache.

A message is authenticated through a known network key.

When a message destination is a unicast address of the edge node or a broadcast address or a group address is an address to which the edge node belongs.

A relay node is a device that is provided with main power, wakes up all the time and can transmit data received for other nodes.

The relay node can re-transmit a received message to other nodes when the following conditions are satisfied.

A message is not present in a message cache.

A message is authenticated through a known network key.

When a field (e.g., relay count value) indicating whether a message is relayed is a value that permits relay When a destination address is not a unicast address allocated to the relay node In the Bluetooth mesh network, data transmission schemes of relay nodes may be divided into flooding and routing.

In the flooding scheme, the source device 200 transmits a message to a specific relay node and the specific relay node that has received the message transmits the message with information on another relay node or the destination device 400 to which the message will be re-transmitted.

The routing scheme uses a broadcast channel or a point-to-point connection scheme for message reception and re-transmission.

Further, in the routing scheme, a routing device that has received a message determines a best routing route(s) for transmitting the message to an intermediate device or a destination device and determines a route through which the message will be transmitted on the basis of a determined routing table.

However, since messages need to be transmitted with routing tables maintained in the routing scheme, the routing scheme has disadvantages that complexity increases as the number of messages increases, a large number of memories is required, it is less dynamic than flooding and it is more difficult to realize than flooding, but the routing scheme has the advantage of high extendability The flooding scheme refers to a method by which relay nodes receiving messages send the messages to the air using the characteristic of radio waves spreading in the air.

That is, the flooding scheme refers to a method by which the source device 200 transmits a message to relay nodes through broadcast channels and the relay nodes transmits the message to neighboring relay nodes such that the message is transmitted to the destination device 400.

The flooding scheme uses a broadcast channel for message reception and re-transmission and can extend a message transmission range.

A mesh network with respect to the flooding scheme is a dynamic network in which a device can receive and transmit (or re-transmit) a message at any time as long as device density satisfies the same.

The flooding scheme has the advantage of easy implementation but may have a extendability problem when a network extends because messages are transmitted without directivity.

That is, in a mesh network with respect to the flooding scheme, when a device transmits a message, multiple devices receive the message and transmit the received message to other devices.

Further, the flooding scheme can easily transmit a message without a routing table construction cost, distinguished from the routing scheme, but has the disadvantage of increasing network traffic due to a characteristic that all devices which have received a message retransmit the received message.

To prevent this, the number of devices constituting the mesh network may be adjusted in a range of 100 to 1000 and an accurate number of devices may be determined by various factors.

For example, an accurate number of devices may be determined by network capacity, traffic loads of data sources, network latency and reliability requirements.

In the present specification, a hop refers to a link between devices in the Bluetooth mesh network. That is, a link established between a source device and a relay device, between relay devices, between a relay device and a destination device, and between a source device and a destination device can be referred to as a hop.

FIG. 7 is a flowchart illustrating an example of a method by which a device to which the present disclosure is applicable joins in the Bluetooth mesh network.

To join in a mesh network and operate, a new device or a non-provisioning device needs to be subjected to a provisioning procedure.

The provisioning procedure refers to a procedure for authenticating an unauthenticated device and providing basic information (e.g., a unicast address, various keys, etc.) used to join in a mesh network.

That is, the provisioning procedure is a procedure through which a provisioner of a mesh network provides information for joining in the mesh network. A first device can acquire a network address, keys, a device identifier, and various types of information for operating as a part of the mesh network through the provisioning procedure.

The provisioning procedure includes an invitation step, a public key exchanging step, an authentication step, and a provisioning data distribution step.

The provisioning procedure may be performed through various types of bearers. For example, the provisioning procedure may be performed by an advertising-based bearer, a mesh provisioning service-based bearer, or a mesh-based bearer.

The advertising-based bearer is an essentially established bearer. When the advertising-based bearer is not supported or provisioning data cannot be transmitted through the advertising-based bearer, the provisioning service-based bearer or the mesh-based bearer may be used for the provisioning procedure.

The provisioning service-based bearer refers to a bearer for transmitting/receiving provisioning data through the existing GATT protocol of BLE, and the mesh-based bearer refers to a bearer for transmitting/receiving provisioning data through a mesh network when the first device and the second device are not located in a range in which they can directly transmit/receive data to/from each other.

A procedure of establishing the advertising-based bearer will be described later.

After a bearer is established between the first device and the second device, the first device can be provisioned through the following provisioning procedure.

Invitation Step

The invitation step starts when a provisioner scan the first device. The first device transmits a beacon message to the provisioner (S6010). The beacon message includes a UUID of the first device.

The provisioner that has scanned the first device 300 through the beacon message transmits an invite message to the first device (S6020).

Here, the invite message is a message for inquiring of the first device whether to perform the provisioning procedure, and the first device ignores the invite message when the first device does not want to perform the provisioning procedure.

However, in a case where the first device wants to perform the provisioning procedure, that is, the first device intends to join in a mesh network, the first device transmits a capability message to the provisioner in response to the invite message (S6030).

The capability message may include information representing whether the first device supports setting of a security algorithm, a public key, information representing whether a value can be output to a user, information representing whether a value can be received from the user, and the like.

Public Key Exchanging Step

Thereafter, the provisioner transmits a start message for starting provisioning to the first device (S6040).

If a public key cannot be used through out-of-band technology, the provisioner and the first device exchange public keys (S6050 and S6060).

However, if a public key can be used through the out-of-band technology, the provisioner may transmit an ephemeral public key to the first device and read a static public key from the first device using the out-of-band technology.

Thereafter, the provisioner authenticates the first device by performing an authentication procedure (S6070).

Provisioning Data Distribution Step

Upon authentication of the first device through the authentication procedure, the provisioner and the first device calculate and generate a session key.

Thereafter, the provisioner transmits provisioning data to the first device (S6080).

The provisioning data may include an application key, a device key, a network key, IVindex, and a unicast address.

Upon reception of the provisioning data, the first device transmits a complete message to the provisioner in response to the provisioning data, and the provisioning procedure ends (S6090).

Coordination of Devices Entities

FIG. 8 is a diagram illustrating coordination of devices entities proposed in the present specification.

Coordination of devices provides a mechanism by which member devices can identify themselves as a group.

In addition, coordination of devices provides a mechanism by which using devices discover and authenticate devices in a set using the aforementioned mechanism.

A member is composed of set information set by a managing device and can identify itself as a member of a coordinated set with respect to using devices.

Further, a member may transmit the set information to a using device at the time of bonding and provide information about a specific information of a member device coordinated in the set.

A using device may receive the set information from member devices at the time of bonding, identify all members in the set using the set information, and coordinate functions between members.

Further, a using device may verify update of a coordinated set from members and perform a verification procedure for verifying which device is a member of the set.

A managing device may configure member devices using the set information to construct a coordinated set.

Further, the managing device may add a member to an existing set or eliminate a member therefrom.

In addition, the managing device and each member may share a device key used to update the set information independently of a root key of the set.

Further, separate keys may be obtained from the device key for device confirmation and authentication.

FIGS. 9(a) and (b) are diagrams illustrating procedures for authentication and verification of coordination of devices.

Referring to FIG. 9(a), first, a member and a using device are securely connected to each other (S9010).

The member transmits coordination of device (CoD) set information to the using device (S9020).

Here, the member, the using device and a new member share the CoD set information.

Here, the CoD set information may include a set identifier for identifying a CoD set and a root key used for verification and encryption.

Here, only the member has a device key used for authentication.

Subsequently, the using device performs a process of discovering and pairing a new member (S9030).

Subsequently, the using device and the new member are securely connected to each other (S9040).

Specifically, in step S9040, it is verified whether the new member is in the same CoD set as the member through the CoD set information and the new member is connected to the using device.

Subsequently, the using device relays a command for authentication between the member and the new member and performs a process of verifying whether the new member is included in the CoD set (S9050).

FIG. 9(b) is a diagram illustrating a case where there is a representative member among members.

Referring to FIG. 9(b), first, authentication between a representative member and a new member is performed (S9060).

Subsequently, the representative member notifies the using device that the representative member is a representative through advertising including a flag indicating that the representative member is the representative (S9070).

This is for the purpose of allowing the using device to be able to discover the representative member from among members.

Subsequently, verification between the representative member and the using device is performed (S9080).

Here, a verification key may be used to perform step S9080.

Specifically, step S9080 may be performed by a managing device before a new set root key is provided or performed at the time of binding a set root key to a specific function.

Here, although the managing device is used as an initiator of device verification and a device verification is used, a function block the same as membership verification is used.

FIG. 10 is a diagram illustrating easy pairing according to the present specification.

First, an easy pairing client and an easy pairing server are connected to each other (S10010).

Subsequently, the easy pairing client transmits an attribute protocol (ATT) write request message to the easy pairing server, and the easy pairing server transmits a response message to the write request message to the easy pairing client (S10020).

Here, the write request message may be operation code (op code) of a control point or may be a message for requesting a GAP operation of the easy pairing server.

Here, the response message may be an error message for the write request message.

Subsequently, the easy pairing server can perform the requested GAP operation with another device (S10030).

Then, the easy pairing server notifies the easy pairing client of a result of the operation performed in step S10030, and the easy pairing client transmits confirmation therefor to the easy pairing server (S10040).

Here, when a user moves while using a specific Bluetooth service, the user may be out of a communication range or link quality may deteriorate to disrupt the service.

For example, in the case of an audio related service, even when a plurality of audio gateways is installed to cover a service area because a single audio gateway cannot cover the service area, there is a problem that, when a user wants to continuously use a service while moving, the service needs to be suspended with respect to a previously connected to a gateway and then re-started with respect to another gateway installed in an area to which the user has moved.

Hereinafter, a specific method for performing handover using Bluetooth by a user in order to continuously use a service will be described in the present specification.

In the method which will be described later, a voice agent (VA) which is a using device refers to a user device and a voice gateway (VG) refers to a member device.

In addition, VG devices which will be described later may have the same meaning as that of a target device.

(Method 1)—Coordination of Devices (CoD), Coordination of Device Handover (CDH)

Method 1 is a method of performing handover on the basis of coordination of devices (CoD).

An operation process of method 1 will be described in detail with reference to FIG. 11.

FIG. 11 illustrates an operation process on the assumption that a VA is connected to VG#1 through Bluetooth and moves to an area where VG#2 and VG#3 are installed while using an audio service, but the present disclosure is not limited to this example.

Referring to FIG. 11, VG devices VG#1 to VG#3 may be grouped into a single group sharing an authentication key.

Here, grouping may be performed by a managing device.

Here, the aforementioned group may refer to a coordinated set.

First, the managing device may register VG#1 to VG#3 as members in the same set through a member addition operation (S11010).

Here, the process of registering VG#1 to VG#3 as members in the same set may mean grouping VG#1 to VG#3 into a single coordinate set.

Here, the member devices in the same set can share a coordinated set identifier.

Subsequently, VG#1 to VG#3 may broadcast member information and the VA may collect and retrieve information on neighboring members through the member information (S11020).

Subsequently, the VA selects a VG (e.g., VG#1) most suitable to use the service through Bluetooth, performs an authentication process with respect to the selected VG and uses the service (S11030 and S11040).

Here, the authentication process may be an authentication method separately defined in CoD.

Here, in a case where the VA that is using the service moves out of VG#1 coverage and approaches VG#2 coverage, that is, the VA becomes closer to VG#2 than VG#1, a situation in which handover is necessary may occur.

Here, whether handover is necessary may be determined on the basis of a link state between the VA and VG#1 and a link state between the VA and VG#2.

Further, whether handover is necessary may be determined by comparing the link state between the VA and VG#1 and the link state between the VA and VG#2 with a predetermined threshold value.

In this case, the VA discovers VG#2, checks whether VG#2 is a member in the same coordinated set including the previously selected VG#1, and performs Bluetooth connection with VG#2 for a Bluetooth service (S11050).

In addition, in a case where the VA moves out of VG#2 coverage and performs handover while approaching VG#3 coverage, step S11050 is also performed.

Here, an authentication key used for Bluetooth connection in step S11050 may be the same as the key for performing authentication in step S11030.

Through this process, the VA can perform handover without a procedure of generating a separate key and exchanging the same with each VG for communication.

(Method 2)—Easy Pairing Handover (EPH)

Method 2 is a method for performing handover using easy pairing.

An operation process of method 2 will be described in detail with reference to FIG. 12.

First, when VG devices VG#1 to VG#3 are present in coverage ranges thereof, the VG devices may be connected through Bluetooth (S12010).

Here, VG#1 may serve as a connection manager for easy pairing.

Subsequently, the VG devices broadcast device information and a VA selects a VG device (e.g., VG#1) suitable to perform Bluetooth communication, and performs an authentication procedure with respect to the selected VG device (S12020 and S12030.

Thereafter the VA can establish a Bluetooth link with the selected VG device and uses a service (S12040).

Here, in a case where the VA that is using the service moves out of VG#1 coverage and approaches VG#2 coverage, that is, the VA becomes closer to VG#2 than VG#1, a situation in which handover is necessary may occur.

Here, whether handover is necessary may be determined on the basis of a link state between the VA and VG#1 and a link state between the VA and VG#2.

Further, whether handover is necessary may be determined by comparing the link state between the VA and VG#1 and the link state between the VA and VG#2 with a predetermined threshold value.

In this case, the VA can notify VG#1 that the VA has become closer to VG#2 through an easy pairing message and can request handover from VG#1 to VG#2 (S12050).

Subsequently, upon reception of the request message, VG#1 transmits information about the VA to VG#2 and transmits information about VG#2 to the VA (S12060).

Here, the information transmitted by VG#1 may include the authentication information used when the authentication procedure of step S12030 is performed.

Thereafter, the VA and VG#2 can perform a Bluetooth connection procedure using the authentication information received from VG#1 and then use a Bluetooth service (S12070).

Further, the VA may perform handover to VG#3. Here, VG#2 can transmit the information about the VA to VG#3 and transmit information about VG#3 to the VA as described above.

Thereafter, the VA and VG#3 can perform a Bluetooth connection procedure using authentication information received from VG#2 and then use the service. Here, the procedure of steps S12050 to S12070 is used as a specific connection procedure.

(Method 3)—Mesh Handover (MH)

Method 3 is a method for performing handover using a mesh.

An operation process of method 3 will be described in detail with reference to FIG. 13.

First, a provisioner device can construct a single mesh network with VG devices VG#1 to VG#3 through a provisioning procedure. Here, each VG device can be configured as a mesh node (S13010).

Subsequently, the provisioner device receives information about a VA from the VA (S13020).

Subsequently, the VA can discover the mesh network through an authentication/network information procedure with respect to the provisioner device and acquire a network/application key (S13030).

Here, the network/application key may have already been acquired from the provisioner device.

Here, the VG devices configured as mesh nodes can share information related to the VG devices and/or the VA including the network/application key.

Subsequently, the VA can discover the mesh network, check proximity and execute a Bluetooth service with VG#1 (S13040).

Specifically, in step S13030, the VA can perform proximity check through a method such as mesh ping, discover a suitable VG (VG#1 in the aforementioned example), transmit a handover request message using a mesh packet (advertising packet) and start a link setup procedure.

Here, the VA can perform Bluetooth communication with VG#1 using the network/application key acquired in step S13030 to use the service.

Here, in a case where the VA that is using the service moves out of VG#1 coverage and approaches VG#2 coverage, that is, the VA becomes closer to VG#2 than VG#1, a situation in which handover is necessary may occur.

Here, whether handover is necessary may be determined on the basis of a link state between the VA and VG#1 and a link state between the VA and VG#2.

Further, whether handover is necessary may be determined by comparing the link state between the VA and VG#1 and the link state between the VA and VG#2 with a predetermined threshold value.

Here, the VA can establish a link with VG#2 for the Bluetooth service through proximity check and use the service using the same procedure in S13030. Here, an authentication key for Bluetooth communication may be the network/application key.

In this handover method using a mesh, the VG devices (mesh nodes) of the mesh network share a specific authentication key for Bluetooth connection.

Accordingly, in a process in which the VA moves and hands over to each VG device of the mesh network, the VA can perform Bluetooth communication using the specific authentication key without generating a separate authentication key.

Here, the proximity check refers to a process of checking whether the VA connected to a VG device through Bluetooth becomes far away from the VG device.

Method 3 is similar to method 1 but differs from method 1 in that the former uses a mesh network and communicates with the mesh network instead of one-to-one communicating with each VG.

(Method 4)—Member Information Exchange Handover (MIEH)

Method 4 is a method of performing member information exchange handover (MIEH).

An operation process of method 4 will be described in detail with reference to FIG. 14.

First, VG devices (VG#1 to VG#3) may be connected through Bluetooth (S14010).

Subsequently, a VA may discover VG#1, perform authentication and then use a Bluetooth service (S14020).

Here, in a case where the VA that is using the service moves out of VG#1 coverage and approaches VG#2 coverage, that is, the VA becomes closer to VG#2 than VG#1, a situation in which handover is necessary may occur.

Here, whether handover is necessary may be determined on the basis of a link state between the VA and VG#1 and a link state between the VA and VG#2.

Further, whether handover is necessary may be determined by comparing the link state between the VA and VG#1 and the link state between the VA and VG#2 with a predetermined threshold value.

Here, VG#1 performs proximity check, and when the VA becomes far away from VG#1, performs a handover information exchange process with VG#2 (S14030 and S14040).

Here, information such as an authentication key used for Bluetooth connection between the VA and VG#1 can be transmitted in step S14040.

Further, the authentication key may be shared by the VG devices connected through Bluetooth in step S14010.

Subsequently, when VG#2 is determined to be a device suitable to provide the Bluetooth service to the VA, handover request/response message exchange with the VA is performed (S14050).

Here, the handover request message may be requested by the VA to VG#1 or requested by VG#1 to the VA.

Subsequently, VG#2 can perform Bluetooth connection with the VA using handover information acquired in step S14040, establish a link for the service and provide the service (S14060).

Here, the aforementioned authentication key may be used for Bluetooth connection between the VA and VG#2 in step S14060.

Further, the VA may perform handover from VG#2 to VG#3 through steps S14030 to S14060, as described above.

Although method 4 is similar to method 2, method 4 differs from method 3 in that the latter a VG device that is providing a service relays Bluetooth connection between a VG and another VG device, whereas the former exchanges handover information through Bluetooth connection between VG devices. [458]

(Method 5)—External Interface Manager Handover (EIMH)

Method 5 is a handover method using an external interface manager.

An operation process of method 5 will be described in detail with reference to FIG. 15.

First, a managing device can register VG#1 to VG#3 as members of the same set through a member addition operation (S15010).

Subsequently, a VA can discover VG#1, perform authentication, and then use a Bluetooth service (S15020).

Subsequently, an external interface continuously manages statuses of the VG devices (VG#1 to VG#3) through a service status check process with respect to the VG devices (S15030).

Specifically, the VG devices check services executed with the VA, a VG device closer to the VA, an authentication key used for connection with the VA, and the like and report the same to the external interface manager.

In addition, the reported details may be shared with the members in step S15010.

For example, upon determining that the VA is connected with VG#1 in a poor state and connected with VG#2 in a better state while the VA is connected with VG#1 through Bluetooth to the service, this connection status can be reported to the external interface manager.

Here, the aforementioned connection status may be determined on the basis of the link state between the VA and VG#1 and the link state between the VG and VG#2.

Here, the external interface causes the VA to be connected (handed over) to VG#2 such that the VA can continuously use the Bluetooth service (S15040).

Here, whether handover is necessary may be determined by comparing the link state between the VA and VG#1 and the link state between the VA and VG#2 with a predetermined threshold value.

Here, the aforementioned authentication key may be used for connection between the VA and VG#2.

Here, the external interface may notify VG#1 that handover is necessary on the basis of the aforementioned connection status such that VG#1 can instruct the VA to perform handover or cause VG#2 to directly attempt to set up a link with the VA.

Here, a handover request message may be transmitted in order to instruct the VA to perform handover. The handover request message may be a message transmitted on the basis of a first link state between VG#1 and a using device and a second link state between VG#2 and the using device.

Further, the external interface may be an external service, for example, in method 5.

For example, the external server may acquire information (authentication key) about a user device that uses the same account, and when a new device of the user using the account performs Bluetooth connection with a previous user device, allow the new device to perform Bluetooth connection using the acquired authentication key.

FIG. 16 is a diagram illustrating a method for performing a transaction protocol.

An ID may be hashed in order to avoid request collision.

A user device is automatically connected to a neighboring audio manager (AM), and each AM has a notification characteristic of indicating that some open requests are completed.

Accordingly, the user device can ascertain that a specific request is completed by reading notification.

That is, a network delay may be assumed to be close to almost 0, and if there is a network delay, an audio engine can process the network delay.

For example, operations of paying a fee using a credit card, searching neighboring restaurants through a search engine, and the like can be performed.

FIG. 17 is a diagram illustrating an algorithm of determining a specific one handover method from among methods 1 to 5.

First, a device (leader) which determines a handover method is determined (S17010).

Then, it is determined whether the leader is a VG (S17020).

Here, when the leader is a VG, a decision factor (DF) is determined (S17030).

If the DF of S17030 is security, external interface manager handover (EIMH) (method 5) is determined as a handover method (S17040 and S17050).

If the DF of S17030 is not security, member information exchange handover (MIEN) (method 4) is determined as a handover method (S17040 and S17060).

On the other hand, when the leader is not a VG in step S17020, a DF is determined (S17070).

If the DF of step S17070 is handover delay, coordination of devices (CoD, method 1) is determined as a handover method (S17080 and S17090).

If the DF of step S17070 is not handover delay, it may be determined whether the DF is scalability (S17110).

Here, if the DF is scalability, mesh handover (method 3) is determined as a handover method (S17120).

On the other hand, the DF is not scalability in S17110, easy pairing handover (method 2) is determined as a handover method (S17130).

Table 2 below shows DFs, description of DFs, and handover methods in response thereto.

TABLE 2

| Decision factor (DF) | Descriptions | Method |
| --- | --- | --- |
| VA power consumption | Power consumption on VA side is considered as important | EIMH, MIEH |
| VG power consumption | Power consumption on VG side is considered as important | MH, EPH, CDH |
| Handover delay | Delay during message exchange for handover is considered as important | CDH |
| Security | Key management mechanism is required | MH, EPH, CDH, EIMH |
| Scalability | A large number of VA handovers is required | MH, CDH |

FIG. 18 is a diagram illustrating user interfaces (UIs) that can be displayed on a user device when handover operations of methods 1 to 5 are performed.

Examples of UIs displayed on a user device (VA) when handover operations of methods 1 to 5 proposed in the present specification are performed will be described on the basis of FIG. 18.

Here, VG devices may be configured in a coordinated set or a mesh network as described above.

For example, situation 1 is a situation in which a user carrying a user device (e.g., a headset, a device equipped with a microphone, other devices including an input/output device, or the like) enters an airport where VGs are installed.

Here, the user device is not connected to any VG device through Bluetooth.

Here, a UI such as A which indicates "disable" may be displayed before the user enters the airport.

Situation 2 is a situation in which the user has entered the airport and the user device is using a service through Bluetooth communication with the VG devices installed in the airport.

Here, a UI such as B may be displayed on the user device.

Further, when the user device is a device including an input/output unit, the user device may notify the user that a service for communication with a VG is available through a specific notification (e.g., a voice message, beep sound, SMS, an image, or the like).

Here, the aforementioned service may be an audio related service. In this case, the user device may transmit a message representing that audio data will be started to the VG or transmit utterance of the user as audio data through a connected audio transmission link upon recognition of the utterance of the user transmitted through an input device (e.g., a microphone).

In addition, when the user executes a voice command through the user device, for example, the user inputs the voice command after pressing a specific button of the user device, and the user device may transmit a message representing that audio data will be started to the VG when the specific button is pressed.

Further, when the user device is not using a service using Bluetooth although it can perform Bluetooth communication in situation 2, the user device may output only a Bluetooth image in the UI B.

Next, situation 3 is a situation in which the user cannot perform communication with any VG in a process of performing handover to a VG during movement.

Here, a UI such as C may be displayed on the user device, and the user device can provide a notification (voice, a pop-up message, or the like) indicating that the user device is disconnected from the VG.

Next, situation 4 is a situation in which the user device in the state such as situation 3 switches to a state in which Bluetooth communication is available and thus is using the service through Bluetooth communication.

Here, a UI such as D may be displayed on the user device, and the user device can provide a notification (voice, a pop-up message, or the like) indicating that communication can be resumed.

Next, situation 5 is a situation in which the user exits the airport.

That is, the user device may be in a situation in which it does not communicate with any VG device.

Here, a UI such as E may be displayed on the user device, and the user device can provide a notification (voice, a pop-up message, or the like) indicating that communication is impossible.

Furthermore, although embodiments have been described with reference to respective figures for convenience, embodiments illustrated in figures may be combined to realize a new embodiment. In addition, design of a computer-readable recording medium storing a program for executing the above-described embodiments belongs to the scope of the present disclosure in response to demand of those skilled in the art.

The methods according to the present specification may be non-limited by the configurations and methods of the embodiments mentioned in the foregoing description, and the embodiments mentioned in the foregoing description can be configured in a manner of being selectively combined with one another entirely or in part to enable various modifications.

Meanwhile, methods according to the present specification can be implemented with processor-readable code in a processor-readable recording medium provided to a network device. The processor-readable medium may include all kinds of recording devices capable of storing data readable by a processor. Examples of the processor-readable medium may include a ROM, a RAM, a CD-ROM, magnetic tapes, floppy disks, optical data storage devices, and the like and also include such a carrier-wave type implementation such as transmission over the Internet. Furthermore, as the processor-readable recording medium is distributed to a computer system connected via a network, processor-readable code can be saved and executed according to a distributed system.

Although the present disclosure has been described with reference to the exemplary embodiments, those skilled in the art will appreciate that various modifications and variations can be made in the present disclosure without departing from the spirit or scope of the disclosure described in the appended claims. Accordingly, the present disclosure should not be limited to the specific embodiments and the scope of the present disclosure should be determined by the appended claims and their equivalents.

Both apparatus and method inventions are mentioned in this specification and descriptions of both of the apparatus and method inventions may be complementarily applicable to each other.

INDUSTRIAL APPLICABILITY

Although handover methods of the present disclosure have been described on the basis of examples in which the handover methods are applied to Bluetooth system, the handover methods can be applied to various wireless communication system in addition to Bluetooth system.

The invention claimed is:

1. A method by which a user device performs a handover in a wireless communication system, the method comprising:
   performing a Bluetooth connection procedure with a first target device based on first authentication information;
   measuring a first link state between the user device and the first target device;
   measuring a second link state between the user device and a second target device;
   determining whether to perform a handover to the second target device based on the first link state and the second link state;
   determining a handover method for performing the handover to the second target device from among a plurality of handover methods supported by the user device, based on a plurality of factors that include (i) a power consumption of the first target device and the second target device, (ii) a power consumption of the user device, (iii) a handover delay, (iv) a security related to whether security key management is required; and (v) a scalability related to a number of the handover to be performed; and
   performing a Bluetooth connection procedure with the second target device based on (i) execution of the handover to the second target device being determined and (ii) the determined handover method, wherein second authentication information for the Bluetooth connection procedure with the second target device is the same as the first authentication information for the Bluetooth connection procedure with the first target device.

2. The method of claim 1, wherein the step of determining whether to perform the handover to the second target device is further based on comparing the first link state and the second link state with a predetermined threshold value.

3. The method of claim 1, wherein the first target device and the second target device are set to a single group, and the first authentication information is shared by the first target device and the second target device.

4. The method of claim 3, further comprising:
   receiving information about the second target device from the second target device based on the execution of the handover to the second target device being determined,
   wherein the information about the second target device includes the first authentication information and a group identifier; and
   wherein the performing the Bluetooth connection procedure with the second target device comprises the steps of:
   confirming whether the second target device and the first target device belong to a same group based on the group identifier; and
   performing the Bluetooth connection procedure with the second target device based on the first target device and the second target device belonging to the same group.

5. The method of claim 1, further comprising: outputting a user interface (UI) for the user device being connected by Bluetooth based on the user device performing the Bluetooth connection procedure with the first target device.

6. The method of claim 5, wherein the UI for the user device being connected by Bluetooth and the UI for the Bluetooth connection procedure being not available correspond to at least one of a voice message, a pop-up message, SMS or an image.

7. The method of claim 1, further comprising: outputting a user interface (UI) for a Bluetooth connection procedure being not available for the user device based on the user device performing the Bluetooth connection procedure with the first target device and the second target device.

8. The method of claim 7, wherein the UI for the user device being connected by Bluetooth and the UI for the Bluetooth connection procedure being not available correspond to at least one of a voice message, a pop-up message, SMS or an image.

9. A method by which a user device performs a handover in a wireless communication system, the method comprising:
   performing a Bluetooth connection procedure with a first target device based on first authentication information;
   receiving a handover request message from the first target device or a second target device, wherein the handover request message is a message transmitted from an external device to the first target device or the second target device based on a first link state between the first target device and the user device and a second link state between the second target device and the user device;
   determining a handover method for performing the handover to the second target device from among a plurality of handover methods supported by the user device, based on a plurality of factors that include (i) a power consumption of the first target device and the second target device, (ii) a power consumption of the user device, (iii) a handover delay, (iv) a security related to whether security key management is required; and (v) a scalability related to a number of the handover to be performed;
   receiving second authentication information for a Bluetooth connection procedure with the second target device based on the handover request message from the external device; and
   performing the Bluetooth connection procedure with the second target device based on (i) the second authentication, information and (ii) the determined handover method,
   wherein the second authentication information for the Bluetooth connection procedure with the second target device is the same as the first authentication information for the Bluetooth connection procedure with the first target device.

10. The method of claim 9, wherein the first authentication information is received by an external device from the first target device or the user device and shared by the external device, the first target device and the second target device.

11. A user device performing a handover in Bluetooth, comprising:
   a transmitter;
   a receiver, wherein the transmitter and the receiver is are for communicating with an external device in a wireless or wired manner;
   a memory for storing data; and
   a processor functionally connected to the communication unit, wherein the processor is configured to:
      perform a Bluetooth connection procedure with a first target device based on first authentication information;
      measure a first link state between the user device and the first target device;
      measure a second link state between the user device and a second target device;
      determine whether to perform a handover to the second target device based on the first link state and the second link state;
      determine a handover method for performing the handover to the second target device from among a plurality of handover methods supported by the user device, based on a plurality of factors that include (i) a power consumption of the first target device and the second target device, (ii) a power consumption of the user device, (iii) a handover delay, (iv) a security related to whether security key management is required; and (v) a scalability related to a number of the handover to be performed; and
      perform a Bluetooth connection procedure with the second target device based on (i) execution of the handover to the second target device being determined and (ii) the determined handover method,
   wherein second authentication information for the Bluetooth connection procedure with the second target device is the same as the first authentication information for the Bluetooth connection procedure with the first target device.

12. The user device of claim 11, wherein the processor is further configured to:
   determine the handover to the second target device by comparing the first link state and the second link state with a predetermined threshold value.

13. The user device of claim 11, wherein the processor is further configured to:
   output a user interface (UI) for the user device being connected by Bluetooth based on the user device performing the Bluetooth connection procedure with the first target device.

14. The user device of claim 11, wherein the processor is further configured to:
   output a user interface (UI) for a Bluetooth connection procedure being not available for the user device based on the user device performing the Bluetooth connection procedure with the first target device and the second target device.

* * * * *